US011366343B2

(12) United States Patent
Varady et al.

(10) Patent No.: US 11,366,343 B2
(45) Date of Patent: Jun. 21, 2022

(54) SYSTEMS AND METHODS FOR ADJUSTING STOCK EYEWEAR FRAMES USING A 3D SCAN OF FACIAL FEATURES

(71) Applicant: Bespoke, Inc., San Francisco, CA (US)

(72) Inventors: Eric J. Varady, Piedmont, CA (US); Robert Varady, New York, NY (US); Wyatt Eberspacher, San Francisco, CA (US)

(73) Assignee: BESPOKE, INC., San Francisco, CA (US)

( * ) Notice: Subject to any disclaimer, the term of this patent is extended or adjusted under 35 U.S.C. 154(b) by 0 days.

(21) Appl. No.: 16/948,614

(22) Filed: Sep. 24, 2020

(65) Prior Publication Data

US 2021/0088811 A1   Mar. 25, 2021

Related U.S. Application Data

(60) Provisional application No. 62/904,883, filed on Sep. 24, 2019.

(51) Int. Cl.
*G02C 13/00* (2006.01)
*G06F 30/17* (2020.01)
(Continued)

(52) U.S. Cl.
CPC .......... *G02C 13/005* (2013.01); *G06F 30/17* (2020.01); *G06T 19/20* (2013.01); *G06V 10/44* (2022.01);
(Continued)

(58) Field of Classification Search
CPC ... G02C 13/005; G06F 30/17; G06F 2111/04; G06K 9/00214; G06K 9/00281; G06K 9/4604; G06T 19/20; G06T 2219/2016
See application file for complete search history.

(56) References Cited

U.S. PATENT DOCUMENTS

2013/0088490 A1\* 4/2013 Rasmussen ........... G06T 19/006
345/421
2015/0055086 A1\* 2/2015 Fonte ................... G02C 13/003
351/178
(Continued)

FOREIGN PATENT DOCUMENTS

EP    3214595 A1    9/2017
EP    3410178 A1    12/2018
(Continued)

OTHER PUBLICATIONS

Xiaoling Gu et al., "iGlasses: A Novel Recommendation System for Best-fit Glasses" SIGIR '16: Proceedings of the 39th International ACM SIGIR conference on Research and Development in Information Retrieval, Jul. 2016; https://doi.org/10.1145/2911451.2911453 (4 pages).

*Primary Examiner* — Sing-Wai Wu
(74) *Attorney, Agent, or Firm* — Bookoff McAndrews, PLLC

(57) ABSTRACT

Systems and methods are disclosed for generating a 3D computer model of an eyewear product, using a computer system, the method including obtaining an inventory comprising a plurality of product frames; scanning a user's anatomy; extracting measurements of the user's anatomy; obtaining a first model of a contour and/or surface of the user's anatomy, based on the extracted measurements of the user's anatomy; identifying, based on the contour and/or the surface of the user's anatomy, a first product frame among the plurality of product frames; determining adjustments to the first product frame based on the contour and/or the surface of the user's anatomy; generating a second model rendering comprising the adjusted first product frame matching the contours and/or the surface of the user's anatomy.

22 Claims, 12 Drawing Sheets

(51) Int. Cl.
*G06T 19/20* (2011.01)
*G06V 10/44* (2022.01)
*G06V 20/64* (2022.01)
*G06V 40/16* (2022.01)
*G06F 111/04* (2020.01)

(52) U.S. Cl.
CPC .......... *G06V 20/653* (2022.01); *G06V 40/171* (2022.01); *G06F 2111/04* (2020.01); *G06T 2219/2016* (2013.01)

(56) References Cited

U.S. PATENT DOCUMENTS

| | | | |
|---|---|---|---|
| 2016/0299360 A1* | 10/2016 | Fonte | B29D 12/02 |
| 2016/0327811 A1* | 11/2016 | Haddadi | G02C 13/001 |
| 2018/0017815 A1* | 1/2018 | Chumbley | G02C 5/12 |
| 2020/0103675 A1* | 4/2020 | Schwarz | G06T 7/33 |

FOREIGN PATENT DOCUMENTS

| | | |
|---|---|---|
| EP | 3425446 A1 | 1/2019 |
| WO | WO 2013/177456 A1 | 11/2013 |

* cited by examiner

SYSTEMS AND METHODS FOR ADJUSTING STOCK EYEWEAR FRAMES USING A 3D SCAN OF FACIAL FEATURES

RELATED APPLICATION(S)

This application claims priority to U.S. Provisional Application No. 62/904,883 filed Sep. 24, 2019, the entire disclosure of which is hereby incorporated herein by reference in its entirety.

FIELD OF DISCLOSURE

Various embodiments of the present disclosure relate generally to eyewear customization. In particular, systems and methods are disclosed for accepting stock eyewear frames using a scan of facial features.

BACKGROUND

Eyewear is most commonly mass-produced, with a particular style available in one or two generic colors and sizes. It is very difficult for customers to find the one perfect pair of glasses for their unique taste, facial anatomy, and needs. Currently, customers may visit an eyewear store or optician, an optician may take measurements of the customers' face, and the optician may help to narrow the customer's selection of eyewear by suggesting frames based on their measurements and prescription. In addition, customers may select a frame, opticians/lab technicians may insert lenses into the selected frame, and customers may then try on the assembled eyeglasses. Often, the eyeglasses need to be adjusted to fit the customer's face. Many customers opt for help on-site at physical eyewear stores, where opticians may take measurements of the customer's face or eyes to aid in eyewear selection and the fitting eyewear to a customer's face. For this process, the customer must be present for the optician fitting. The need for physical presence is inconvenient. In addition, such processes are prone to variance or error, based on optician human error in taking the measurements, optician training, measuring tools used, a customer moving while measurement(s) are being taken, etc.

Thus, there is a desire to permit eyewear fittings, without the need for a customer to be physically present. There is also a desire to better ensure accuracy of the measurements, among other consumer experience and economic goals and benefits of an improved system.

The foregoing general description and the following detailed description are exemplary and explanatory only and are not restrictive of the disclosure.

SUMMARY

According to certain aspects of the present disclosure, systems and methods are disclosed for modelling a human face and stock frames in order to produce a customized stock frame product, and generating instructions for adjusting and previewing stock eyewear frames according to an exemplary embodiment of the present disclosure.

In accordance with an embodiment, a method for generating instructions for adjusting and previewing stock eyewear frames according to an exemplary embodiment of the present disclosure includes: receiving 3D scans and/or 3D CAD files of a plurality of eyewear frames; obtaining a 3D scan and/or images of an individual's face; extracting face measurements of the individual's face from the 3D scan and/or images; calculating fit parameters based on the extracted face measurements of the individual's face and 3D scans and/or 3D CAD files of the plurality of frames; identifying a filtered subset of the plurality of frames that satisfy the calculated fit parameters based on aesthetic, fit, adjustability, and/or optical constraints; selecting or receiving a selection of one of the filtered subset of frames that satisfy the calculated fit parameters; adjusting a 3D frame model of the selected frames based on the individual's extracted face measurements, according to one or more aesthetic, fit, adjustability, and/or optical constraints; solving for 3D position of wear lens measurements associated with the 3D frame model relative to the individual's extracted face measurements; previewing the adjusted 3D frame model over images and/or a 3D scan of the individual's face based on the solved 3D position; and generating instructions for adjusting a physical pair of the selected frames to match adjusted 3D frame model.

In accordance with another embodiment, a system for generating instructions for adjusting and previewing stock eyewear frames according to an exemplary embodiment of the present disclosure includes: at least one memory storing instructions; and at least one processor configured to execute the instructions to perform operations including: receiving 3D scans and/or 3D CAD files of a plurality of eyewear frames; obtaining a 3D scan and/or images of an individual's face; extracting face measurements of the individual's face from the 3D scan and/or images; calculating fit parameters based on the extracted face measurements of the individual's face and 3D scans and/or 3D CAD files of the plurality of frames; identifying a filtered subset of the plurality of frames that satisfy the calculated fit parameters based on aesthetic, fit, adjustability, and/or optical constraints; selecting or receiving a selection of one of the filtered subset of frames that satisfy the calculated fit parameters; adjusting a 3D frame model of the selected frames based on the individual's extracted face measurements, according to one or more aesthetic, fit, adjustability, and/or optical constraints; solving for 3D position of wear lens measurements associated with the 3D frame model relative to the individual's extracted face measurements; previewing the adjusted 3D frame model over images and/or a 3D scan of the individual's face based on the solved 3D position; and generating instructions for adjusting a physical pair of the selected frames to match adjusted 3D frame model.

In accordance with another embodiment, a computer-implemented method for: obtaining an inventory comprising a plurality of product frames; scanning a user's anatomy; extracting measurements of the user's anatomy; obtaining a first model of a contour and/or surface of the user's anatomy, based on the extracted measurements of the user's anatomy; identifying, based on the contour and/or the surface of the user's anatomy, a first product frame among the plurality of product frames; determining adjustments to the first product frame based on the contour and/or the surface of the user's anatomy; generating a second model rendering comprising the adjusted first product frame matching the contours and/or the surface of the user's anatomy.

It is to be understood that both the foregoing general description and the following detailed description are exemplary and explanatory only and are not restrictive of the disclosed embodiments, as claimed.

DESCRIPTION OF THE EMBODIMENTS

Figure 1:
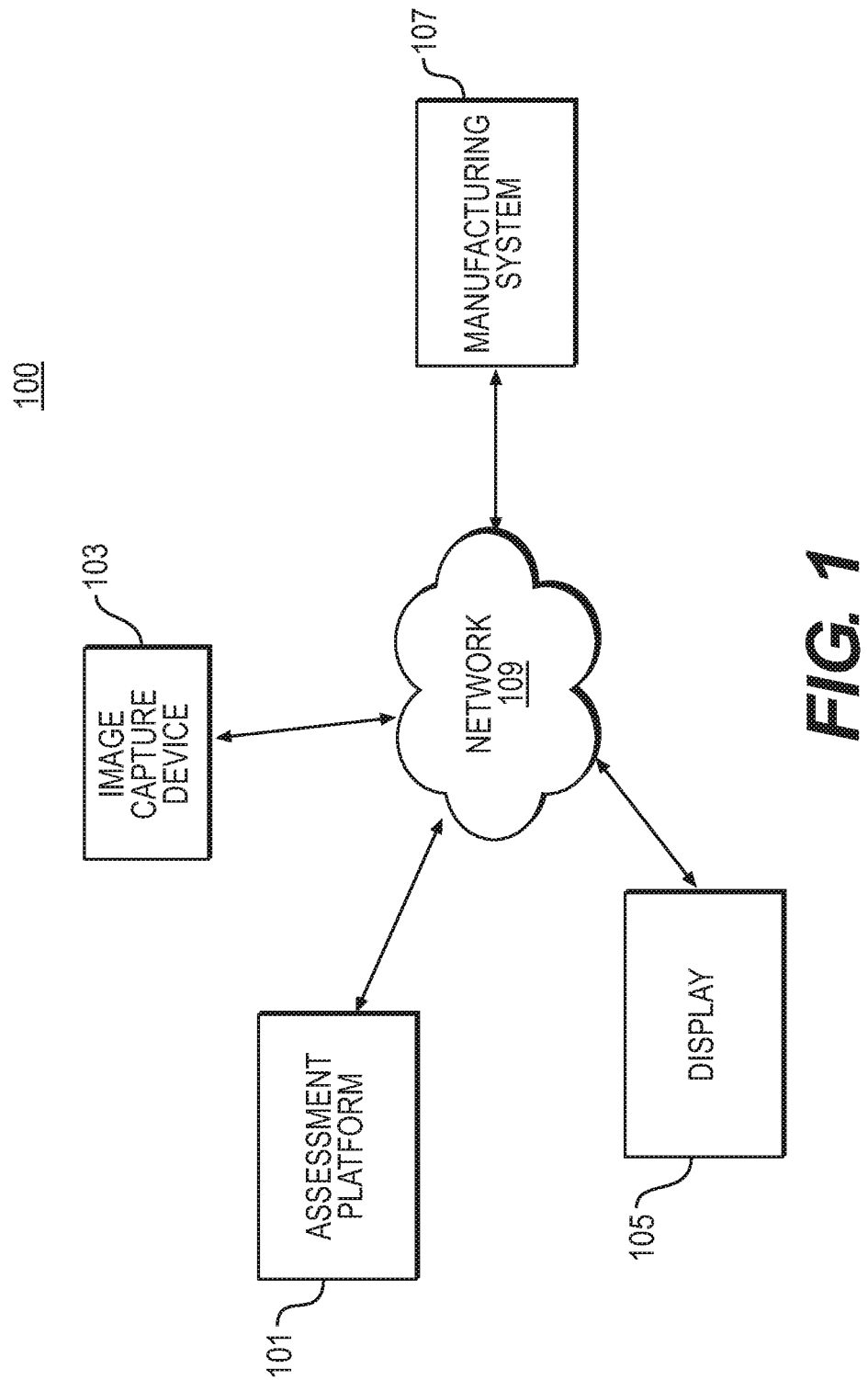
FIG. 1 is a block diagram of an exemplary system and network for modelling a human face and stock frames in order to produce a customized stock frame product, and generating instructions for adjusting and previewing stock eyewear frames, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Embodiments of the present disclosure relate to systems and methods for adjusting parameters of an eyewear frame and lenses to fit the eyewear to a customer, using a scan of the customer's face. The scan may comprise a three-dimensional (3D) scan and the eyewear frame may comprise stock frames. Stock eyewear frames may also be referred to as "ready-to-wear" or "off the shelf" eyewear. In other words, stock eyewear frames may be the type and style of eyewear frames that are manufactured in relatively large quantity and are generally not customized by a manufacturer to fit one or more particular individuals. Stock eyewear may be considered "one size fits all" eyewear that is adjusted by an optician to fit each individual user.

The adjusted geometric parameters may ensure that eyewear shipped to an eyewear store and/or customer fits, without a need for additional optician fittings or adjustments. The adjustments may fit a stock frame to a customer's face, and fit the lenses to optimize the customer's optics. For example, the disclosed systems and methods may provide interfaces with instructions or schematics that aid eyewear professionals (e.g., opticians or lab technicians) in parametrically adjusting eyewear in order to position the stock eyewear and lens to achieve desired optical performance. The disclosed systems and methods may also automatically compute or provide eyewear adjustments based on a scan of a customer's face.

An optician may physically adjust a frame until it fits well, and then optical measurements may be taken, either manually (e.g., using a sharpie then manual measurement) or using various digital/optical measurement technology (e.g, by clipping onto the frame a device with fiducials of known size and relative distance from one another, then a single-camera or multi-camera apparatus measures positons of fiducials against pupil locations to solve for optical measurements).

The present systems and methods may assist eyewear professionals in adjusting stock eyewear to fit a customer, using simply a scan of the customer's face. This may allow a customer to be fit with customized frames, without having to be physically present at an eyewear store or site. The systems and methods may reduce variability or inaccuracies in eye professionals' fittings.

According to an embodiment, a frame inventory may be produced by 3D scanning each frame in a frame inventory and/or importing 3D CAD files of frames. A 3D scan of a patients' face may be performed, and measurements of the face may be extracted in real-time. Fitting calculations may be performed, and inventory may be filtered out that violates aesthetic, fit, adjustability, and/or optical considerations. The results may then be reviewed physically-accurately and photo-realistically.

Embodiments of the present disclosure relate to solving for 3D position of wear lens measurements on a post-adjusted frame, before any adjustments to a physical frame have ever been done in the real world. Previously, in a retail store, a customer would select a frame off the shelf and say "I want to buy this," an optician would physically adjust the frame until it fits well, and then optical measurements would be taken manually or using digital/optical measurement technology.

The systems and methods may enable sales of a frame before the frames have been manufactured. The systems and methods may include anonymously aggregating 3D fitting data of customers and feeding the information back to retailers to help retailers optimize the physical and digital inventory they should carry. The systems and methods may include feeding data back to frame companies in order to optimize what they choose to design for their next collection, and it can yield better prediction models of sell-thru, and ensure they are ordering/manufacturing the right size of any lot of frames, in the right colors. The systems and methods may enable frame companies to pre-sell their products to retailers or end-customers before they have even been manufactured.

Referring now to the figures, FIG. 1 is a block diagram of an exemplary system and network for modelling a human face and stock frames in order to produce a customized stock frame product, and generating instructions for adjusting and previewing stock eyewear frames, according to an exemplary embodiment of the present disclosure. Assessment platform 101 (e.g., computer system) may be in communication with an image capture device 103, a display 105, and a manufacturing system 107. In one embodiment, assessment platform 101 may be installed on a user's mobile device (e.g., as a mobile app). In another embodiment, a user mobile device may communicate remotely with assessment platform 101. In yet another embodiment, any portion of functions of assessment platform 101 may be performed, at least in part, by a user mobile device and/or other device(s). In one exemplary embodiment, the assessment platform 101 may further comprise server systems that may include storage devices for storing received images and data and/or processing devices for processing received image and data. Image capture device 103 may include, but need not be limited to, a user mobile device, single-lens camera, video camera, multi-lens camera, a multi-camera, IR camera, laser scanner, interferometer, etc., or a combination thereof. The image capture device is henceforth referred to as "camera."

In one embodiment, assessment platform 101 may also be in communication with a display 105. The display 105 may include but is not limited to a display screen of a user's mobile device, LCD screens, flexible screens, projections, holographic displays, 2D displays, 3D displays, heads-up displays, or other display technologies. The assessment platform 101 may include an input device for controlling the assessment platform 101 including, but not limited to, a touchscreen, keyboard, mouse, track pad, or gesture sensor. The input device may be part of the display 105 and/or communicate with the display 105. The assessment platform 101 may be further configured to provide an interface for a user (e.g., the user or a user similar to or related to the user, an eyewear professional, etc.) to view, customize, browse, and/or order custom products. This interface may be rendered by display 105, which may be either part of, or remote, from the assessment platform 101, in various embodiments.

In one embodiment, assessment platform 101 may be installed on a mobile device comprising image capture device 103. Image capture device 103 may further serve as display 105. In one embodiment, assessment platform 101, image capture device 103, and/or display 105 may communicate to collect digital input of an object of unknown size and/or an object of known size.

Figure 2A:
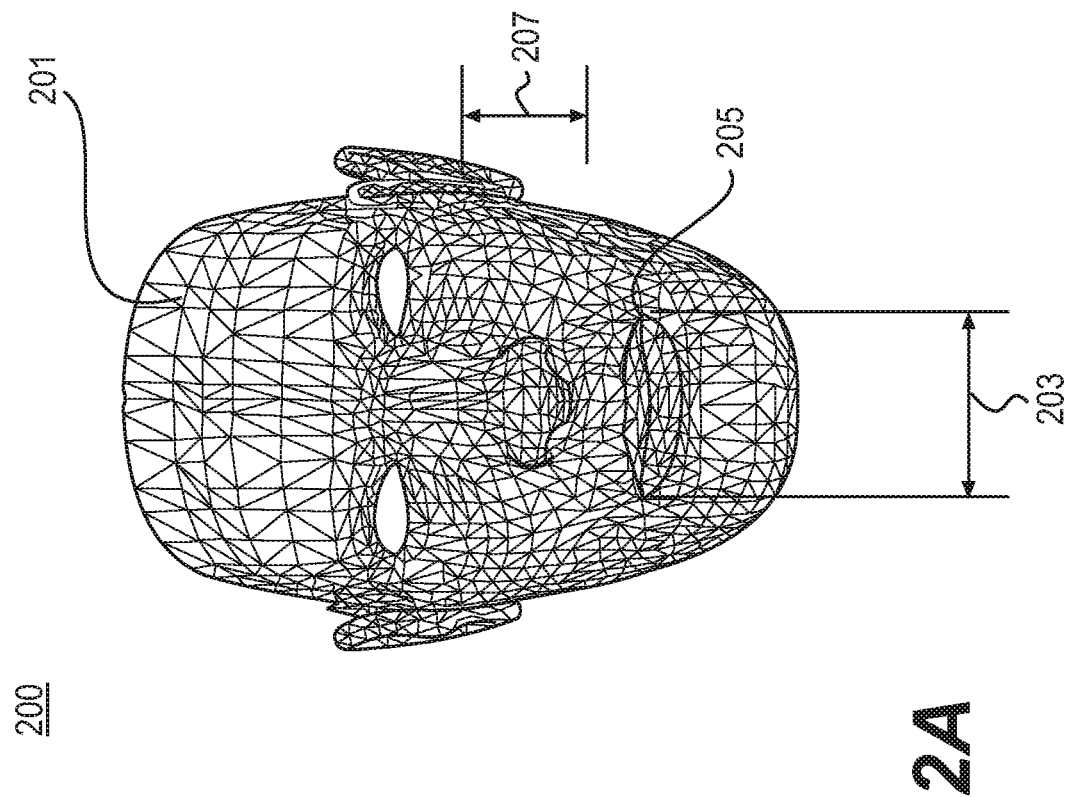
FIG. 2A depicts an exemplary anatomic model, according to an embodiment of the present disclosure.
Figure 2A:
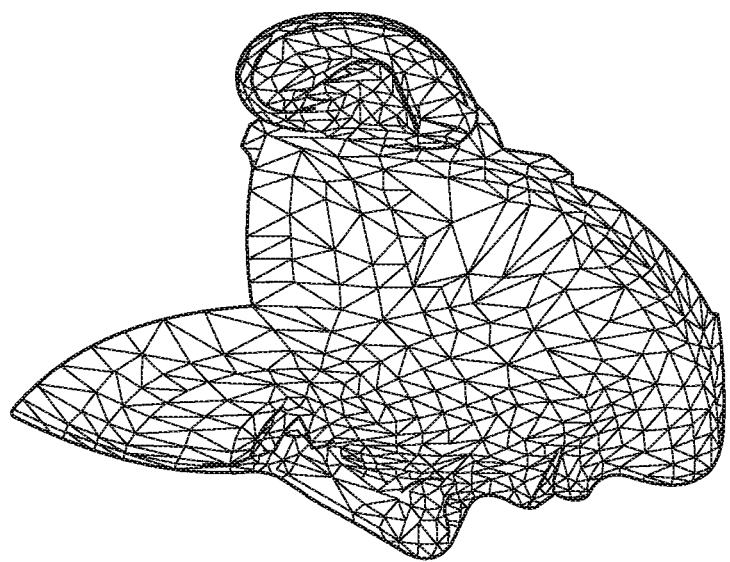

FIG. 2A depicts an exemplary anatomic model 200, according to an embodiment of the present disclosure. In one embodiment, assessment platform 101 may receive an anatomic model of a user, who may upload, input, and/or transfer his or her anatomic data to assessment platform 101 via digital input. For example, a user may transfer one or more images and/or a video of his/her facial features to the assessment platform 101, e.g., from another computer system or an image capture device. In some scenarios, the assessment platform 101 may further receive measurement input by a user, e.g., the assessment platform 101 may provide a display including one or more prompts or instructions, guiding a user to submit various forms of anatomic data. In an exemplary embodiment, the assessment platform 101 may generate an anatomic model of the user based on the digital input and/or measurement data of the user's anatomy.

Anatomic model 200 may be comprised of a mesh 201. The resolution of the mesh 201 may be altered based on curvature, location, and/or features on the user's face, etc. For example, mesh 201 around the eyes and nose may be higher resolution than mesh 201 at the top of the head. In an exemplary embodiment, the anatomic model 200 may include the front and side face area, though in other embodiments, the anatomic model 200 may model the entire head, while including more detail at the modeled eyes and nose. Alternative representations may include point clouds, distance maps, image volumes, or vectors.

In one embodiment, local facial deformation can occur as a user's expression changes during capture of digital input. This may be due to user smiling or talking during the capture. The exemplary systems and methods disclosed herein may anticipate and account for local facial deformation during capture of digital input and robustly reconstruct a 3D face by tracking these facial deformations and non-rigidly morphing a reconstructed 3D face mesh to align with the image data of the digital input. The non-rigid deformation to align with a subject's face may be performed independent of a learned 3D shape space model (e.g., of a subject's face), and need not be constrained by it. Effectively, this means that facial deformations need not be modeled by the 3D shape space model and can be handled by the disclosed systems and methods. In this way, the assessment platform 101 may produce accurate scaling despite any facial deformation not seen by the pre-trained (or learned) 3D shape space model. In some cases, the same process of non-rigid 3D face mesh deformation may be performed both for a selfie (e.g., a first image data input that permits 3D reconstruction of a user's face) and a scale video capture (e.g., a second image data input (e.g., a video) with an object of known size). The 3D face mesh and reconstructed 3D object may then be used to produce the scaled anatomic model 200.

In an exemplary embodiment, a generalized quantitative anatomic model may be distorted to fit the user's face, e.g., based on anatomic data input by the user. The model 200 may be parameterized and represented as a mesh, with various mesh points affected by adjusting parameters. For example, mesh 201 may include various mesh elements, such that one parameter may constrain or influence another parameter. For example, a parameter (e.g., user expression) may influence the length 203 of mouth feature 205, the height of cheek feature 207, and by extension, the portion of lenses of a custom eyewear product that a user may be looking through. In this example, if the parameter influencing length 203 were adjusted, then the appropriate elements of the mouth 205 and cheek feature 207 (and lens portion) would adjust coordinates in order to match the parameter specified. Other models, e.g., a shape model, may have generalized parameters like principal components that do not correspond to particular features but allow the generalized anatomic model to be adapted to a plurality of different face sizes and shapes.

In one embodiment, a computer system (e.g., assessment platform 101) may analyze received digital input/image data to iteratively perform a sequence of feature detection, pose estimation, alignment, and model parameter adjustment. A face detection and pose estimation algorithm may be used to determine a general position and direction the face is pointing toward, which may aid in model position and alignment. Machine learning methods may be used to train a classifier for detecting a face as well as determining the pose of the head in an image that is post-processed to define various features, including but not limited to Haar-Like or Local Binary. Training datasets may include of images of faces in various poses that are annotated with the location of the face and direction of pose, and also include specific facial features. The output may include a location of the face in an image and a vector of the direction of head orientation, or pose.

The assessment platform 101 may further receive or detect the 3D position and 3D angle and/or 3D orientation (e.g., rotation, tilt, roll, yaw, pitch, etc.) of an imaging device relative to the user, while capturing the received image data. In one embodiment, the position and/or orientation of the imaging device may be transmitted to the assessment platform 101, e.g., as part of the image data. In another embodiment, the position and/or orientation of the imaging device may be detected from the image data.

Figure 2B:
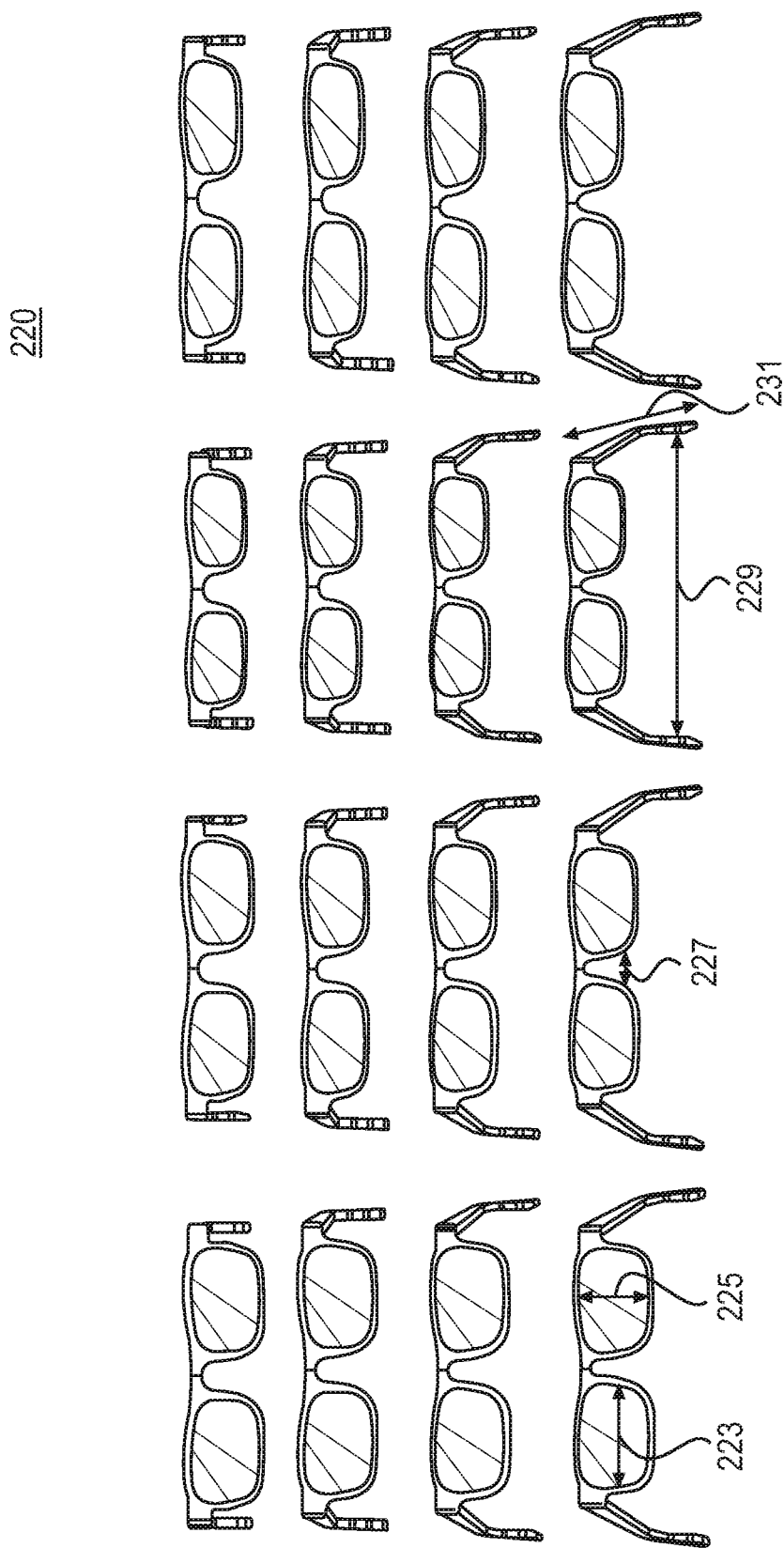
FIG. 2B depicts an exemplary parametric model of a user-specific eyewear product, according to an embodiment of the present disclosure.

FIG. 2B depicts an exemplary parametric model 220 of a user-specific custom eyewear product, according to an embodiment of the present disclosure. Assessment platform 101 may obtain or generate at least one parametric model of a user-specific eyewear product including a frame portion and a lens portion. Assessment platform 101 may further transform the parametric model of the user-specific eyewear product into real-world dimensions, based on a scaled anatomic model.

FIG. 2B includes various examples of configurations and shapes that may be achieved by changing one or more of parameters of the parametric model 220. The parametric model 220 may include a representation of the eyewear product that may be modified to alter properties, including shape, size, color, finish, etc. The parametric model 220 may be adapted to a variety of shapes, sizes, and configurations to fit a diversity of face shapes and sizes. For example, nose pads of an initial parametric model of the eyewear product may not match the contour of the user's nose (e.g., from a user anatomic model). The initial parametric model may instead intersect with the surface of the nose if the initial parametric model is aligned with or overlaid over the user anatomic model. The assessment platform 101 may configure or modify the initial parametric model such that the nose pads match the contour and angle of the user's nose from the user anatomic model, e.g., the nose pads are modified to sit flush against the surface of the modeled user's nose. In some embodiments, parametric model 220 may be generated directly from user anatomic data, without obtaining an initial (e.g., generic) parametric model and modifying the initial model based on the user anatomic data. For example, parametric model 220 may be generated with a provided 3D model of the user's face/anatomic measurements of the user's face, with a 3D mesh or point cloud (e.g., from a depth sensor), and/or another method where a parametric model may be generated without modifying a pre-existing one.

In some embodiments, the parametric model 220 may enable adjustment of at least one parameter, while allowing constraints to be enforced on other parameters so the model may be locally adapted, for example, by adjusting the width and angle of the nose pads on the customized eyewear product without changing anything else about the eyewear product. FIG. 2B shows exemplary parametric model 220 configured to 16 variations. The exemplary configurations depict variations of eyewear lens width 223, lens height 225, nose bridge width 227, the distance 229 between the temples where the earpieces of the frame may contact a user's ears, the distance 231 from the front of the frame to the user's ears, and other minor dimensions. In the illustrated embodiment, the material thickness and hinge size and location may remain unchanged. The parametric configuration may enable the eyewear design to be highly configurable while remaining manufacturable. For example, a manufacturer may use one hinge design and a single selected material thickness for all these designs and more, yet still allow massive customization of the underlying shape and size.

The parametric model 220 may include constraints that prevent certain parts/regions from being altered into a design that is no longer optimal to manufacture. For example, the minimum thickness of parts may be limited to ensure structural strength, and the minimum thickness around the lenses may be limited to ensure the lenses can be assembled into the eyewear without the eyewear breaking or the lenses not being secure within the frame. Furthermore, the hinge locations and optical surface of the lenses may be constrained to ensure that the modeled eyewear would fit and sit at a proper angle for a user. Additionally, certain features may be related due to symmetry or cascading effects; for example, if the computer or user adjusted the width or thickness of one part of the rim, the entire rim on both sides may adjust to ensure a symmetric and attractive appearance. The cascading effects may take into account how symmetry to the frame extends or does not extend to the lenses. For example, two lenses in an eyewear frame may vary based on what each lens corrects. A parametric model 220 may be configured such that the thickness of the frames is adjusted according to the thicker of the two lenses, so that the resulting eyewear remains feeling balanced to the user, even though a frame of a lesser thickness may be sufficient to contain the thinner of the two lenses. Parametric models may be generated and customized using any of the systems and methods described in detail in U.S. Pat. No. 9,304,332, filed Aug. 22, 2014, entitled "Method and System to Create Custom, User-Specific Eyewear," which is incorporated herein by reference in its entirety.

The customized parametric model 220 may be generated as a physical product, based on an accurately scaled anatomic model (e.g., model 200). With improper scaling, a physical version of the customized parametric model 220 may have the geometric dimensions customized to a user (e.g., with nose pads that match the contour and angle of a user's nose, or an earpiece matching the contours and different heights of a user's ears), but overall be the wrong size. For example, manufacturing instructions based on 2D scaling could render a physical product too small to be worn by the user. Accordingly, the 3D scaling methods disclosed herein are crucial to transforming a virtual product into real-world dimensions to generate a physical product.

In addition to geometry, the parametric model 220 may include parameters for the surface finish, color, texture, and other cosmetic properties. Parametric model 220 may include or be rendered with a multitude of materials, paints, colors, and surface finishes. Various rendering techniques known to those skilled in the art, such as ray tracing, may be used to render the eyewear and lenses in a photorealistic manner, showing how the eyewear of the parametric model 220 may appear when manufactured. For example, parametric model 220 may be texture mapped with an image to represent the surface or rendered with texture, lighting, and surface properties, including reflectance, transmission, subsurface scattering, surface, or roughness to represent photorealistic appearance of eyewear. Textures used for reflection may be based on generic environment maps, or they may be generated from data captured by an image capture device. Environmental lighting parameters may be extracted from the data captured by the image capture device and used to render the frame and lenses with the same lighting parameters so that the frames and lenses appear more realistic in rendered previews.

The parametric model 220 may further include such lighting and surface properties for lenses of the parametric model 220, based on the lens curvature, thickness, lens material, lens gradation, corrective aspects, etc. Corrective aspects may include whether the lenses are lenses to correct astigmatism, presbyopia, myopia, etc. The lens portion of the parametric model 220 may contain multi-focal lenses, which may include at least two regions of optical correction, e.g., bifocals, trifocals, progressive, or digitally compensated progressives. For instance, the parametric model 220 may further be adapted so that the lens dimensions fit optical corrections and/or preferences of a user. In one scenario, in addition to the lenses of the parametric model 220 modeling bifocal or progressive multifocal lenses, the placement of the various lens powers of the lenses may vary based on the user's preferences and use of the customized eyewear. Like the modifications to the parametric model 220 that account for the user's anatomy, modifications to the parametric model 220 that serve optical purposes may also enable adjustment of at least one parameter, while constraining other parameters. For example, while the positioning of the magnified reading area within the lens shape may be user-specific for the user's preferences and viewing habits, the actual magnification of this lens section and the gradations (if any) between magnified areas may be constrained.

The parametric model 220 may also account for lens characteristics, for example, in a display shown to a user. For example, one embodiment may include displaying the parametric model 220 on a user interface. For instance, a display of the parametric model 220 may include the aesthetic aspects of the eyeglass (frame and lenses), as well as a simulation of the effects of looking through the lenses, e.g., light distortion, or unmagnified distance and magnified reading areas, peripheral distortion (unwanted astigmatism) of a particular progressive lens design and combination of lens/frame parameters, tint (solid, gradient, and photochromatic), edge thickness, the effects of edge lenticularization, etc.

Another exemplary simulation may also include displaying how a user may look to others, while wearing the eyewear of the parametric model 220. For example, if the lenses may cause a user's eyes to look smaller to a person seeing the user, the simulation may show the distortion to the user's eyes. Other optical interaction effects, e.g., shadows and reflections, can be displayed on the eyewear and on a 3D model of the user's face (e.g., as shown in FIG. 2A). The calculated thickness of the users lens can also be rendered, in order to allow the user to determine if a higher index (and therefore thinner and more aesthetically pleasing) lens would be appropriate. The parametric model 220 may include hinge points at the temples to allow the temples to flex with respect to the frame front and fit to a model of the user's face. In another embodiment, the parametric model 220 may also account for an elastic modulus (stretch) in the bulk material property of the frame and/or lens, and this elastic property can be dependent on the frame material or lens material selected.

Scan of the Frames

According to an exemplary embodiment, a frame inventory may be produced by 3D scanning each frame in a frame inventory and/or importing 3D CAD files of frames.

Scan of the Individual's Anatomy

The scan of the individual's face may include a 3D scan, e.g., acquired from imaging device(s). During the 3D scan, measurements of the face may be extracted in real-time, fitting calculations may be performed, and inventory filtered out that violates aesthetic, fit, adjustability, and/or optical considerations, and then the results may be previewed physically-accurately and photo-realistically.

One or more embodiments may include solving for all optical measurements without a physical frame put on, and instructing a professional how to adjust the frame not only to fit, but to ensure measurements are correct. Therefore, it may be done remotely, and it may be done with an expanded inventory.

Self-portraits, for instance done through the utilization of smart phones and/or electronic cameras may be useful in providing the image information necessary for the deriving the required anatomic models. Various features of the image formed from a smart phone may be utilized in generating 3D scanning or modeling of a person's face. Thus, a convenient method of inputting a person's anatomical features, may be to use the ubiquitous cell phone for the image capture. In some embodiments, the self-portrait from a single camera may provide the customer's face scan or anatomical modeling.

Instructions may be provided to a customer to place their face in certain positions while the computer system captures and analyzes image data of the customer's face. A computer system may utilize a smart phone or handheld electronic camera for the capture of the image of the person's face. A single camera view of an individual may permit 3D modeling, and more particularly the generation of an anatomic model.

The computer system may require that certain objects are present in acquired image(s) to provide reference of scale. It may be important to ensure the dimensions of the eyewear are appropriately sized relative to the customer's face, and providing dimensions to the image data or the resulting anatomic model and measurements is needed to ensure accurate sizing. Reference objects may include but are not limited to: coins, rulers, sheets of paper, credit cards, computer disks, electrical or computer connectors, stamps, a calibration target on a computer device, or the computer device itself. The objects, when positioned near the customer's face, provide a reference dimension for the system to set dimensions to the image data. If other image technology is available, such as a depth camera, or if shape model techniques with intrinsic dimensions are used then reference objects may not be needed since the scale of the image data could be determined by the imaging equipment or shape model.

In an exemplary embodiment, once the customer has followed instructions and is positioned in front of the computer system's imaging device, acquisition and analysis of their data begin. A first reference image may be captured with a reference object held by the customer in the same field as their face. The image data captured by the computer is analyzed by the computer system to detect the reference object and measure its size, for example in pixels. The image data may further be analyzed by the computer system to detect one or more of a plurality of features, including but not limited to: pupils, eyes, nose, mouth, ears, face, eyebrows, hair, etc. In an exemplary embodiment, the customer's pupils are detected, and landmarks placed on the center of each pupil. In another embodiment, the customer may optionally be queried to confirm or edit the location of each pupil marker to ensure accuracy. With the data previously analyzed from the reference object the distance in pixels between pupils or other features is scaled from pixels to a unit of distance such as millimeters or inches. In another embodiment, the customer may have previously acquired data on a dimension(s) of their face, such as pupillary distance obtained from an optometrist or an optical test, and the customer may enter this data into the computer system in lieu of using a reference object for scale. Alternatively, the reference image is acquired later in the process or at the same time as other image data acquisition. Scaling the data with a reference object may ensure that measurements can be derived from' the final quantitative anatomic model of the customer. There may be several key measurements to best determine how to virtually place and fit eyewear on an image of a customer's face.

Scan of the Individual's Head and Face

Once a complete set of image data is acquired, a computer system may analyze the image data to construct a scan or quantitative anatomic model of the individual's face. Various techniques are used to construct the scan or model, and in an exemplary embodiment a scan or quantitative anatomic model is represented as a surface mesh made of elements, including but not limited to polygons, curvilinear elements, etc. A computer system may obtain a scan or anatomic model of a individual's anatomy. The scan or anatomic model may include but is not limited to a parametric or shape model, a 3D mesh or point cloud, a scan, or a set of points or measurements.

The following descriptions are for explanatory purposes to help define the breadth of words used herein. These definitions do not limit the scope of the disclosure, and those skilled in the art will recognize that additional definitions may be applied to each category. By way of definition as used herein, image data may include two-dimensional (2D) image(s), digital images, video, series of images, stereoscopic images, three-dimensional (3D) images, images acquired with standard light-sensitive cameras, images acquired by cameras that may have multiple lenses, images acquired by multiple independent cameras, images acquired with depth cameras, images acquired with laser, infrared, or other sensor modalities. Alternately or in addition, depth information may be received or derived from depth sensor(s) independent of image capture (e.g., depth data from a 3D point cloud with no image(s) associated).

Computer systems may include tablets, phones, desktops, laptops, kiosks, servers, wearable computers, network computers, distributed or parallel computers, or virtual computers. Imaging devices may include single lens cameras, multiple lens cameras, depth cameras, depth sensors, laser cameras, infrared cameras, or digital cameras. Input devices include touchscreens, gesture sensors, keyboards, mice, depth cameras, audio speech recognition, and wearable devices. Displays may include panels, LCDs, projectors, 3D displays, 2D displays, heads-up displays, flexible displays, television, holographic displays, wearable displays, or other display technologies. Previewed images in the form of images, video, or interactive renderings may include images of the customer superimposed with product model images, images of the customer superimposed with rendering of product model, images of the anatomic and product models of the customer, etc. Anatomic models, details, and dimensions may include length of features (e.g., length of nose), distance between features (e.g., distance between ears), angles, surface area of features, volume of features, 2D contours of features (e.g., outline of wrist), 3D models of features (e.g., surface of nose or ear), 3D coordinates, 3D mesh or surface representations, shape estimates or models, curvature measurements, or estimates of skin or hair color definition, and/or estimates of environmental factors (e.g., lighting and surroundings). For example, disclosed embodiments may include analyzing a scene (e.g., of image data), computing lighting of the scene, and rendering customized glasses lenses with the same lighting. In such a display, the glasses and lenses may be previewed in a display realistically mimicking the image data. For example, a customer may capture image data of himself or herself, and then preview a scene of himself or herself wearing customized glasses, as if looking in a mirror or watching footage of himself or herself, at the same scene as in the captured image data. In one scenario, the embodiments may further include capturing the surroundings (e.g., simultaneously, using the same image capture) OR simultaneously capturing images from the REAR camera at the same time that a front camera captures image data of the customer. In the latter instance, images from the rear camera may provide realistic reflections rendered on the lens that correspond to the environment in which the capture was conducted. For example, if a customer captures a video at the beach, a preview may include a rendering of the beach not only behind the customer (captured as part of the images used to build the customer 3D model and then superimposed back on those images), but the preview may also include the beach reflected in the lenses.

The resolution of a scan or anatomic model comprising a mesh may be altered based on curvature, location, and features on the face, etc. For example, the detailed locations around the eyes and nose may be higher resolution than areas where less detail exists, such as the top of the head. In an exemplary embodiment, the face mesh only models the front and side face area, though in other embodiments it models the entire head or any portion thereof that is necessary including smaller regions of the face, such as the eyes and nose only. Alternative representations include point clouds, distance maps, image volumes, or vectors.

The computer system may analyze the image data to iteratively perform a sequence of feature detection, pose estimation, alignment, and model parameter adjustment. A face detection and pose estimation algorithm is used to determine a general position and direction the face is pointing toward, which aids in model position and alignment. Machine learning methods are used to train a classifier for detecting a face as well as determining the pose of the head in an image that is post-processed to define various features, including but not limited to Haar-Like or Local Binary. Training datasets consists of images of faces in various poses that are annotated with the location of the face and direction of pose, and also includes specific facial features. The output consists of a location of the face in an image and a vector of the direction of head orientation, or pose.

Once the face and pose are established for the first image frame, more detailed facial features relevant to eyewear placement and general face geometry may be defined, including but not limited to eye location, nose location and shape, ear location, top of ear location, mouth corner location, chin location, face edges, etc. Again, machine learning may be used to analyze the image to detect facial features and edges. When these features are located, a low-resolution scan or generalized anatomic model parameters may be aligned and adjusted to find the optimal fit with the features, minimizing the error between the detected feature location and the mesh. Additional optimization of the generalized quantitative anatomic model may be performed to enhance the local refinement of the model using the texture information in the image.

In an exemplary embodiment, the generalized quantitative anatomic model has parameters that influence features including but not limited to eye location, eye size, face width, cheekbone structure, ear location, ear size, brow size, brow position, nose location, nose width and length and curvature, feminine/masculine shapes, age, etc. An estimation of the error between the detected features and model may be used to quantify convergence of the optimization. Small changes between adjacent images in the dataset may also be used to refine pose estimation and alignment of the model with the image data.

In an exemplary embodiment, features detected from adjacent image frames may be used to initialize subsequent or previous frames to enhance feature detection. The process continues through as many images as needed and possibly cycle through images multiple times to converge on the optimal parameters to minimize error between the distorted generalized model and the image data. Regularization and smoothing may be employed to minimize noise and variance of features points, pose, and the anatomic model fitting between frames. The final quantitative anatomic model will be scaled based on the reference data such as input from the customer or scaling to a reference object as previously described. Alternatively, if the anatomic model was derived as a shape model in real-world dimensions, the association between the shape and size of the face may be used to directly provide the scale of the model.

The orientation and geometric relationship between the model and image data may be known. A bundle adjustment of the features points and face model across the images may be performed, which provides precise camera locations that register the anatomic model to the image data. This information can be used to orient and register the model to the image data for subsequent rendering.

Those skilled in the art will recognize there are many ways to construct and represent quantitative information from a set of image data. In another embodiment, no prior generalized anatomy model is required to generate a quantitative anatomic model. A method such as structure from motion (SFM) photogrammetry is used to directly build a quantitative anatomic model. In this technique, a series of images is required around the customer's face. The features detected in each image, and the relative distances between the features from image-to-image are used to construct a 3D representation. A method that combines a generalized shape model with subsequent local SFM refinement may be utilized to enhance local detail of features, such as the nose shape.

In another embodiment, the scan or anatomic model consists only of a point cloud of key features that are detected. For example, the center of the eyes, corners of the eyes, tip of the nose, top of the ears, and other important landmarks is detected and tracked through multiple images. These simple points, oriented in space in a dataset, provide all the information needed to obtain quantitative information needed for subsequent analyses. They may be obtained using the methods previously mentioned, or with other methods like active appearance models or active shape models.

Technologies such as depth cameras or laser sensors may be used to acquire the image data, and there exists prior art describing how these technologies can directly produce 3D models, essentially like a 3D scanner, by their ability to detect distance. Additionally, the use of out of focus areas or the parallax between adjacent images is used to estimate depth.

Alternatively, the scan or the anatomic model and dimensions can be derived from a pre-existing model of the customer's face that they possess. Scans or models may be acquired from 3D scanning systems or imaging devices. If a customer already has a scan or an anatomic model their face, they may digitally transfer it to the computer system by non-transitory computer readable media, a network connection, or other means.

During acquisition of customer image data for customizing and fitting products, such as eyewear, the scale and dimensions of the customer may be important to ensure that the size of the resulting product is appropriate and that the customer receives a product that matches the previewed version.

Configurable Product Model

An eyewear model comprising a configurable model of stock eyewear may be obtained. The eyewear model may comprise a three-dimensional geometric model, configured with parametric features and dimensions, and represented as a 3D surface mesh. A 3D model of eyewear may be created from a variety of methods such as 3D capture via scanning or photogrammetry, or through 3D computer aided drafting (CAD) or 3D modeling. It should be noted that a variety of other methods or representations of a configurable model could be used, such as 2D models, shape models, feature-based models, etc.

In an exemplary embodiment, an eyewear model is created by the eyewear manufacturer, including the frames and or frames and lenses. The eyewear model may be created as a surface mesh or a solid model made of elements or features, including but not limited to polygons, curvilinear elements, etc. The eyewear model may enable altering one or more dimensions of the eyewear, which would update appropriate model and mesh elements, while maintaining consistent relationships between other features.

The eyewear model may include features of the stock model which may be altered to enhance fit for a customer, e.g., bridge size, eye size, pupillary distance, interpulliary distance, prescription centering, temple length, hinge type, lens mounting type, nose pad placement, frame width, lens width, lens height, temple style, etc. These features may include features which may be adjusted by an eyewear professional during an eyewear fitting, or during lens cutting.

The parameterization may enable a substantial change to one aspect of a frame or lens without affecting other important elements of the design. The eyewear model may propagate changes from a feature to the rest of the model while constraining all other features. These changes may be represented as simple numeric values, which allows for very efficient data transfer and storage. These parameters could have up to infinite variability of the size and form of the product, allowing ultimate precision, if needed, in fitting a custom model to a customer's anatomy and preferences.

The eyewear model may have constraints that prevent certain key parts/regions from being altered into a design that cannot be altered in a manufactured stock frame or lenses. For example, the minimum thickness of parts may be limited to ensure structural strength, the minimum thickness around the lenses is limited to ensure the lenses can be assembled into the eyewear without the eyewear breaking, and the possible hinge locations may be limited to ensure they could fit and sit at a proper angle. For instance, since stock eyewear frames may use stock component hinges, the connection point of the hinge must be consistent regardless of how the underlying form and shape of the custom eyewear changes. The overall location of features remain constrained, such as the hinge and nose pad locations, etc. Features such as the material thickness and the hinge size and location may also remain unchanged. At the same time, the eyewear model may have hinge points at the temples to allow the temples to flex with respect to the frame front and fit to the customer's face model. In another embodiment, the eyewear model may allow for a suitable amount of elastic modulus (stretch) in the bulk material property of the frame, and this elastic property can be dependent on the frame material selected. All these constraints and relationships may be pre-programmed by the eyewear designer and would be incorporated in the eyewear model.

A plurality of landmark points in the frames may be defined to constrain the model and/or define moveable and/or adjustable locations, regions, or components of the model of the frames. In one embodiment, 2-10 landmark points may be defined. In another embodiment, 10-20 landmark points may be defined. In yet another embodiment, dozens, or even hundreds of landmark points of the frames may be defined. In one embodiment, the landmark points are defined in one or more of locations of the temples, the bridge, the top, bottom, and/or sides of the frames, one or more lens edges of the frames, and/or the nosepads or nosepad arms, or other components. It should be appreciated that the adjustment of "stock" frames according to the present disclosure may include adjustment of only a subset of the landmark points that would have been adjustable in a fully configurable parametric model. For example, in one embodiment consistent with the present disclosure, the methods herein relate to holding fixed any landmark points that are traditionally fixed in a pair of stock eyewear, whereas a plurality of landmark points traditionally associated with optician adjustment of stock eyewear frames may be configurable (i.e., adjustable and/or optimizable according to fit, aesthetic, and/or optical constraints).

As another example, the angle between parts (e.g., at hinges, nose pads, or temple/temple tips) may be limited to ensure structural strength, and the minimum thickness around the lenses may be limited to ensure the lenses can be assembled into the eyewear without the eyewear breaking or the lenses not being secure within the frame. Furthermore, the hinge locations and optical surface of the lenses may be constrained to ensure that the modeled eyewear would fit and sit at a proper angle for a customer. Additionally, certain features may be related due to symmetry or cascading effects; for example, if the computer or customer adjusted the angle of one part of the rim, the entire rim on both sides may adjust to ensure a symmetric and attractive appearance. Schematics and user interfaces may be provided by the present systems, to facilitate an eyewear professional in creating custom-fit eyewear. For example, the present systems may provide an interface which highlights (or has some other visual cue to point out) portions of an eyewear model that cannot be manufactured, or highlighting for portions of an eyewear model for an eyewear professional to adjust.

A user interface provided by present systems may include a workflow of interfaces that takes an eyewear professional through a pre-determined set of configurable fit or optics optimization components for a stock frame. The workflow may automatically ensure that the professional matches or fits each of the components against or using the scan of the customer's head.

In addition to geometry, the eyewear model may include parameters for the surface finish, color, texture, and other cosmetic properties. An exemplary eyewear model may include or be rendered with a multitude of materials, paints, colors, and surface finishes. Various rendering techniques, such as ray tracing, may be used to render the eyewear and lenses in a photorealistic manner, showing how the eyewear model may appear when manufactured. For example, an eyewear model may be texture mapped with an image to represent the surface or rendered with texture, lighting, and surface properties, including reflectance, transmission, subsurface scattering, surface, or roughness to represent photorealistic appearance of eyewear. Textures used for reflection may be based on generic environment maps, or they may be generated from data captured by an image capture device. Environmental lighting parameters may be extracted from the data captured by the image capture device and used to render the frame and lenses with the same lighting parameters so that the frames and lenses appear more realistic in rendered previews. The eyewear model may further include such lighting and surface properties for lenses of the eyewear model, based on the lens curvature, thickness, lens material, lens gradation, corrective aspects, etc. Corrective aspects may include whether the lenses are lenses to correct astigmatism, presbyopia, myopia, etc. The lens portion of the eyewear model may contain multi-focal lenses, which may include at least two regions of optical correction, e.g., bifocals, trifocals, progressive, or digitally compensated progressives.

For instance, the eyewear model may further be adapted so that the lens dimensions fit optical corrections and/or preferences of a customer. In one scenario, in addition to the lenses of the eyewear model modeling bifocal or progressive multifocal lenses, the placement of the various lens powers of the lenses may vary based on the customer's preferences and use of the customized eyewear. Like the modifications to the eyewear model that account for the customer's anatomy, modifications to the eyewear model that serve optical purposes may also enable adjustment of at least one parameter, while constraining other parameters. For example, while the positioning of the magnified reading area within the lens shape may be customer-specific for the customer's preferences and viewing habits, the actual magnification of this lens section and the gradations (if any) between magnified areas may be constrained.

The eyewear model may also account for lens characteristics, for example, in a display shown to an eyewear professional or customer. For example, one embodiment may include displaying the eyewear model on a user interface. For instance, a display of the eyewear model may include the aesthetic aspects of the eyeglass (frame and lenses), as well as a simulation of the effects of looking through the lenses, e.g., light distortion, or unmagnified distance and magnified reading areas, peripheral distortion (unwanted astigmatism) of a particular progressive lens design and combination of lens/frame parameters, tint (solid, gradient, and photochromatic), edge thickness, the effects of edge lenticularization, etc.

Multifocal optics may involve various inputs to model or optimize, e.g., the positioning of the eyes relative to the frames, the positioning of the eyes relative to different portions of a lens, the positioning of one eye of the customer compared to the positioning of another eye of the customer relative to the same lens portion, whether a customer is looking at a distant object or a nearby object, how each of the customer's eyes align with the various lens portions (e.g., based on the height of the customer's ears, the positioning of the customer's eyes, or the shape of the customer's nose, etc.), etc. The lens portion of the model may be a physical representation, e.g., a three-dimensional (3D) model, or it may be a set of numerical parameters for making a lens, e.g., the prescription, base, and other parameters mentioned below. The lens portion of the eyewear model may also be configurable with parameters including but not limited to: lens base (the curvature of the front of the lens), lens profile (the outer shape of the lens), lens bevel or groove shape, lens prescription, multifocal prescription, add power, coatings, pupillary distance (measured as binocular measurements or monocular measurements between the center of a customer's nose and pupil), near pupillary distance (binocular or monocular), size and position of multifocal regions, optical center, segment height (vertical measurement in millimeters from the bottom of the lens to the beginning of the progressive addition on a progressive lens or the top line of a lined bifocal), optical parameters for algorithmic digital "freeform" compensation (e.g., lens configuration, vertex distance (distance from the customer's eyes/pupils to the back surface of the lens), frame wrap, fitting/lens height (vertical location of pupils in the lens), pantoscopic tilt (angle of the lens to the front of the face), etc.), and near pupillary distance ("Pd") (the distance between pupils when one focuses on close objects during activities, e.g., reading, or other ranges of focal distance, including intermediate distances in order to read the dashboard when driving).

Digital compensation may also include selecting lens designs based on various use cases. For example, algorithms for estimating lens configurations for a particular customer may take into account the eyewear's function to the customer or eyewear use cases. For example, eyewear lenses designed for reading glasses will vary from eyewear lenses designed for a customer to see distance objects. Exemplary eyewear use cases may also include whether a customer is an advanced user or a new user. For example, new users may be better suited for bifocal lenses, and advanced users may be better suited for progressive multifocal lenses. "Digitally compensated" progressive lenses may encompass various lens designs that optimize the optical performance for specific activities (e.g., enhance reading area at the slight expense of reduced distance area, or enhance distance area at the expense of reading, or widen corridor and intermediate area at the expense of full reading area (for the purposes of driving or playing golf)). There are also various designs that may yield short-corridor progressive optics that work with trendy short frame designs, as well as beginner progressives that may reduce the "swim" peripheral effect at the expense of maximizing the distance or reading areas.

Changing any of the previously mentioned parameters may influence the lens design and shape, and may affect the optics of the lens. For example, if the reading distance, near Pd, and location of the optics for reading are poorly defined, the customer may not be able to comfortably wear their glasses and read. The discomfort may cause the customer to move their head and glasses to adjust the position of the optics while trying to focus, or render the optics unusable. Since each customer's nose varies in dimensions, there is a great advantage in being able to precisely measure the size and shape of a customer's nose, and then custom fit eyewear (lenses and frames) to perfectly fit that anatomy. Optimum comfort of an eyewear's nose pads positioned on a customer's nose may be achieved if the two contact surfaces are aligned properly and mate such that there are no high pressure-points and if the eyewear is naturally supported in the proper position by the nose. Each customer may have a unique preference as to where on the nose they prefer to wear eyewear for maximum comfort, aesthetic, or utility.

Understanding the quantitative anatomy of the nose may not only allow the frame of a customized piece of eyewear to sit precisely on the nose where desired with maximum comfort, aesthetic, and utility, but also allow a customer immediate clarity and comfort in viewing objects for different tasks, according to their habits. For instance, the distance between nose pads of the eyewear may be related to the location of the lenses relative to a customer's pupils.

Another exemplary simulation may also include displaying how a customer may look to others, while wearing the eyewear of the eyewear model. For example, if the lenses may cause a customer's eyes to look smaller to a person seeing the customer, the simulation may show the distortion to the customer's eyes. Other optical interaction effects, e.g., shadows and reflections, can be displayed on the eyewear and on a 3D model or scan of the customer's face. The calculated thickness of the customer's lens can also be rendered, in order to aid a determination of whether a higher index (and therefore thinner and more aesthetically pleasing) lens would be appropriate. The eyewear model may include hinge points at the temples to allow the temples to flex with respect to the frame front and fit to a model of the customer's face. In another embodiment, the eyewear model may also account for an elastic modulus (stretch) in the bulk material property of the frame and/or lens, and this elastic property can be dependent on the frame material or lens material selected.

Rendering of Post-Adjusted Stock Frames

Previously, virtual try-ons for eyewear have rendered eyewear in its "neutral state", i.e., in the exact shape as it was shipped from the manufacturer to the retailer. However, few customers grab a stock pair of glasses off the shelf, put it on their face, and it fits perfectly. Additionally, few customers order a pair online, have it shipped to their house, and out of the box it fits perfectly. Rather, the stock frames are subsequently adjusted to fit the uniqueness of their face by a trained optical professional: (e.g., the optician (or optometrist)). This adjustment, as part of the traditional optical dispensing process, converts an off-the-shelf stock frame in a unique fit. Clothing tailored to fit a customer (e.g., pants hemmed) is often not returnable. Similarly, for eyewear, once converted from a design that could be adjusted to fit anyone, to a fit specific to one person, it may be not returnable.

If attempts are made to render a pair of glasses on a face by applying a rigid matrix transformation to bring a pair of glasses from its coordinate system to that of the face, there may be a mismatch (unless that pair of glasses were perfectly fitted to the face to begin with). Previous attempts try to overcome the mismatch by minimizing errors of fitting in certain ways, often trying to fit to the front of the face and nose as best as possible, then hiding the fact that the temples do not extend correctly to the ears (in terms of left right temple length, drop, and splay angle) by fading out the temples as they approach the ear (making them more and more transparent as they approach the ear, making them disappear and thus hiding from the user the fact that they don't match well. However, if this hiding were to not occur, one would observe glasses' temples that are too wide floating in space (not contacting the ears), or if too narrow they would be intersecting with the sides of the head. Furthermore, one ear may be further forward or back than the other, and/or higher or lower than the other. Rigidly-fitting a symmetric rigid eyewear body to a face with ear asymmetry (let alone nose asymmetry) will cause some gap, intersection, or mismatch.

According to one or more embodiments, to produce a more-realistic (and higher-converting) virtual try-on of glasses on a face, it may be necessary to perform a sophisticated and intelligent non-rigid transformation of the glasses to the face. The glasses should not only be translated and rotated, but actually deformed in 3D to match the face. This is what optical professionals do every day when they dispense and fit frames to faces. There may be a need for a virtual try-on to do the same, observing the same rules that opticians follow, deforming the frames in exactly the same places and methods that opticians perform.

Figure 2C:
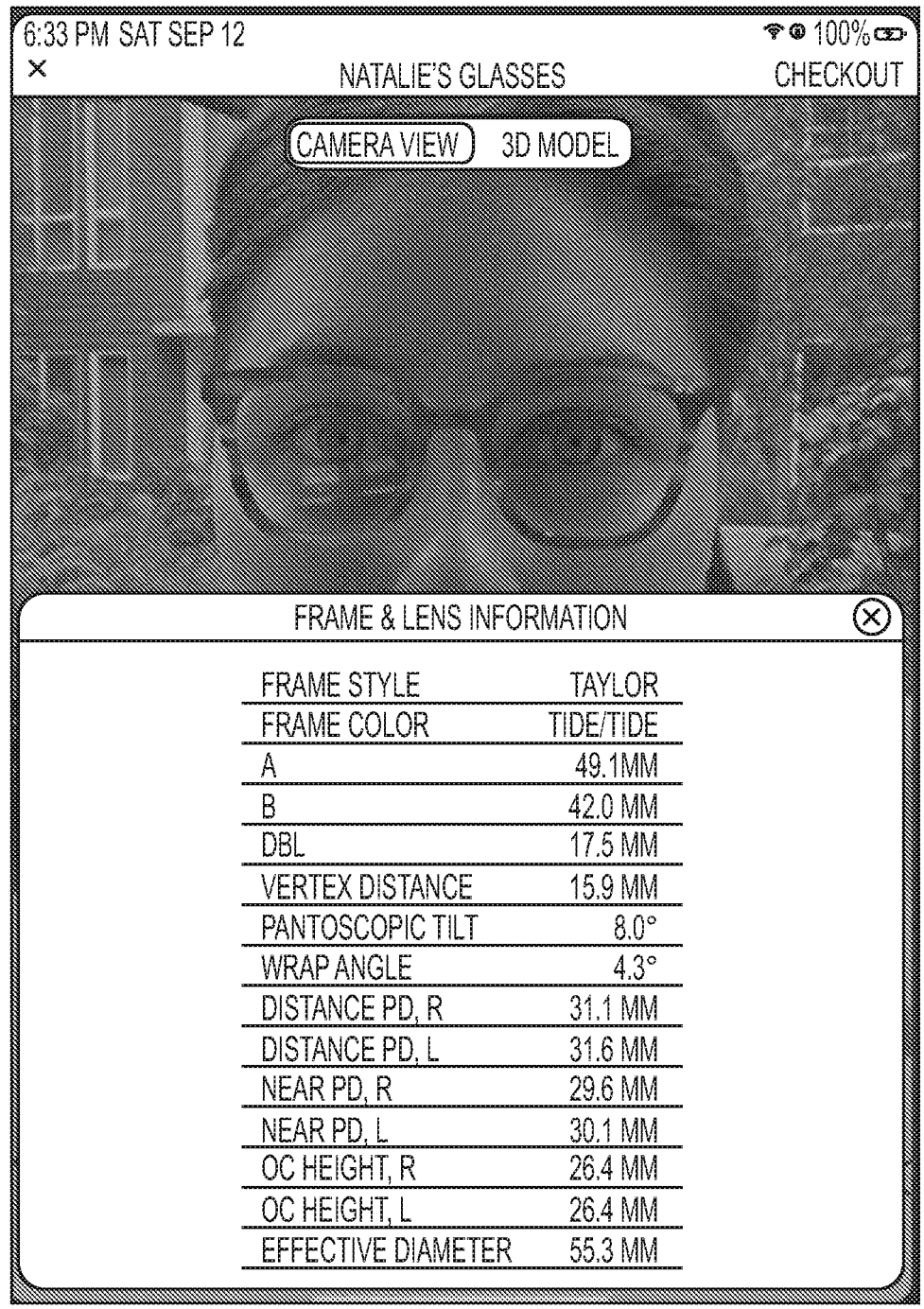
FIG. 2C depicts an exemplary display of model eyewear, according to an embodiment of the present disclosure.

FIG. 2C depicts an exemplary display of model eyewear, according to an embodiment of the present disclosure. As illustrated in FIG. 2C, the glasses are actually deformed in 3D to match the face. Additionally, the measurements for the frame and lens may be presented on the display.

The areas and degrees of adjustability may be a subset of other the methods and systems described in detail in U.S. patent application Ser. No. 14/466,619. Similarly for different base curves of lenses (though this may depend on how lenses are edged—follow-front, 33, 66%, 50%, etc.)

According to one or more embodiments, rendering "post-adjusted" stock frames might not include adjusting the A (lens width), B (lens height), or DBL (bridge width) of the front of the frame, as this is often not adjusted by an optician. However, one or embodiments may include making these adjustments if a stock frame construction would support this. For example, for rimless eyewear, where the A & B are dictated by the edged lens (which is infinitely-configurable and there is freedom to deviate from the shape of the demo lens that shipped with the stock frame when edging a new Rx or plano lens, the DBL can also be adjusted for rimless frames by simply switching out the bridge component for one that is wider or narrower.

One or more embodiments include adjusting in the render the stock frame based on changes to lens base curve. One or more embodiments include supporting numerous ways in how this is done, depending if the lens is edged with follow-front, 33, 66, 50%, etc. One or more embodiments include supporting changes to the frame based on the index of refraction of the lens. One or more embodiments may lock the base curve so no changes to front frame curvature are to be applied when the aesthetic of a frame dictates that this not change (and all curvature must be done via the edging of the lens.

For frames with adjustable metal nosepads, they should be adjusted to fit an individual. Simply rendering a rigid frame in its neutral, e.g., manufactured, state onto a face may cause the nosepads to not match the contours of the patients' nose—they will float in air and not make contact, or interact with the nose, or not sit where an optician would adjust them—a simple preview would not convey to a user what they will look like in the real world, after an optician has adjusted for fit. For adjustable nosepads, according to one or more embodiments, based on a 3D scan of a face (and therefore the 3D scan of the nose), the nosepads can be moved in a physically-realistic manner in six degrees of freedom, to move and rotate to match the 3D contours of the nose, while still connecting to the frame via the nosepads' adjustable arms.

All frames may be adjusted to fit virtually, however there may be limits to adjustability based not only on aesthetic rules (e.g., does a particular frame look good on a face based on various size or optical constraints (which also might vary based on frame construction, lens type or needs (e.g. clear vs tinted lenses)), etc., but also on whether a frame's construction or material can be adjusted to fit. Too much displacement of nosepads may risk breakage. Furthermore, certain orientations may be difficult for an optician to perform. Numerous "fit solutions" may be found, and determining which one to render can be dictated by a set of rules that take as input aesthetic preferences, adjustability ease, etc. The beds around the ear of the temple arms (referred herein as "ear bends") may need to move in to shorten a temple (to fit ears that are further forward), or out to lengthen a temple to fit an ear further from the front of the face. There may be limits to how much an ear bend can be moved in or out—some temple geometries cannot have the ear bend moved in (e.g., temples shortened) very much b/c the temple geometry starts to get very thick and it becomes very difficult to adjust. Or on certain common metal designs, with adjustable plastic temple tips, the adjustability area is only so long, and shortening a temple too much may result in the need to move the bend outside the adjustable region. Lastly, shortening a temple too much may result in an aesthetically-undesirable scenario where there is too much temple left behind the ear.

There may also be limits to how far back the ear bend can be positioned (e.g., how much a temple can be lengthened)—the more it is moved back, the less temple will be left behind the ear to secure the frame to the face.

Some temple geometries do not have temple ear bends moved at all—for example, straightback temples do not bend down around the back of the ear, but rather extend straight-back and curve inwards to hug the side of the head. Other temples can be made of phenolic or carbon fiber, materials that might not be easily adjusted, if at all. A virtual try-on, attempting to provide a more realistic preview, should take such limitations into account that are face-specific, material-specific, style-specific, etc.

Temple splay, e.g., the angle in/out from 90 deg back (if viewing the glasses from above the face), may be useful to adjust in order to achieve temples that extend back to the actual locations of the ears. Too loose, and they will float in space and not contact the side of the head; too tight and they will not only be uncomfortable, but they can also cause distortion to the positioned optics (the front frame will flatten, and in extreme cases or have a wrap angle that goes negative), as well as cause temples that bow outward which may be aesthetically-undesirable. A virtual try-on and dispensing system should calculate the positions of the ears, and determine how much the temple ear bends must be moved inward or outward to achieve the desired amount of inward-compression (interference) to provide a good fit and comfort. However, the preview should be sophisticated enough so as to not render said interference, since in reality the temples will not intersect the head, but be displaced slightly outward as the contact the side of the head with a small amount of compression.

One or more embodiments includes, when adjusting 3D frames to fit, moving vertices. This may cause some unwanted distortion to features. Systems and methods of the present disclosure may include intelligently selecting areas of the frame to not distort, and compensating in areas that are allowed to distort. For example, one or more embodiments include making a frame logo a non-distort area in order to preserve the aesthetics of a trademarked logo and ensure it is rendered appropriately.

Customize Fit of Stock Eyewear to Fit a Customer

The present embodiments may render exactly what a frame will look like after it has been custom-adjusted to fit said customer by a professional, and store the amount that each area of the frame should be adjusted in order to convey to the professional "adjustment instructions" to follow to achieve said fit, even if the patient is not physically-present. Previously, the dispensing of frames, the physical adjustment of frames for proper, had been done in-person. A customer must have been physically present with a trained professional. There was no way for a customer to order a frame online and have it delivered to their home pre-adjusted—it will arrive in its neutral "manufactured-state" and then if it does not fit out-of-the-box (common for Rx eyewear), it must be taken to a professional to have it adjusted (or if the customer would need to adjust it themselves, which may be difficult).

The present embodiments determine how a frame can be adjusted to fit a customer and, based on 3D measurements of the physical frame (or determined from the frame's digital design files) and a 3D scan of a patients face. Since present systems and methods support the remote 3D scanning of patients via a downloadable app or embedded browser-based method to leverage 2D images to build a 3D representation of the face, or via downloadable app or embedded browser-based method to leverage a depth sensor to build a 3D model of a face, patients can upload their 3D face to their retailer/professional of choice and allow the retailer (or its systems) to fit its virtual inventory to said face and power an enhanced post-adjusted shopping experience.

Furthermore, since present embodiments determine how a selected frame should be adjusted to fit a remote individual, and convey to a professional how to adjust said frame to fit, said adjustment can occur remotely, enabling delivery-to-the-home of a "pre-adjusted" frame that fits the customer perfectly out-of-the-box. Present embodiments also enable in-store pickup whereby the frame is already adjusted to fit (saving both the professional, and customer, time during pickup), and/or curbside-pickup.

The present embodiments may include an algorithm that automatically generates instructions and schematics (e.g., for a lab technician or optician) to pre-adjust stock eyewear from a stock fit to a semi-custom or custom fit. Opticians and lab technicians may measure factors based on customer anatomy and prescription. The factors may include, for example, bridge size, eye size, pupillary distance, interpulliary distance, prescription centering, temple length, hinge type, lens mounting type, nose pad placement, frame width, lens width, lens height, temple style, etc.

Conveying how to adjust a frame to an eyecare professional can be done via a list of adjustment deltas: move the ear bends inwards by say 10 mm, extend the right temple 6 mm, increase the pantoscoptic tilt by 2 deg, etc. However, this method of conveying instructions may be difficult to follow. Furthermore, conveying verbally or textually how to adjust adjustable nosepads in six degrees of freedom may not be accurate.

Figure 3:
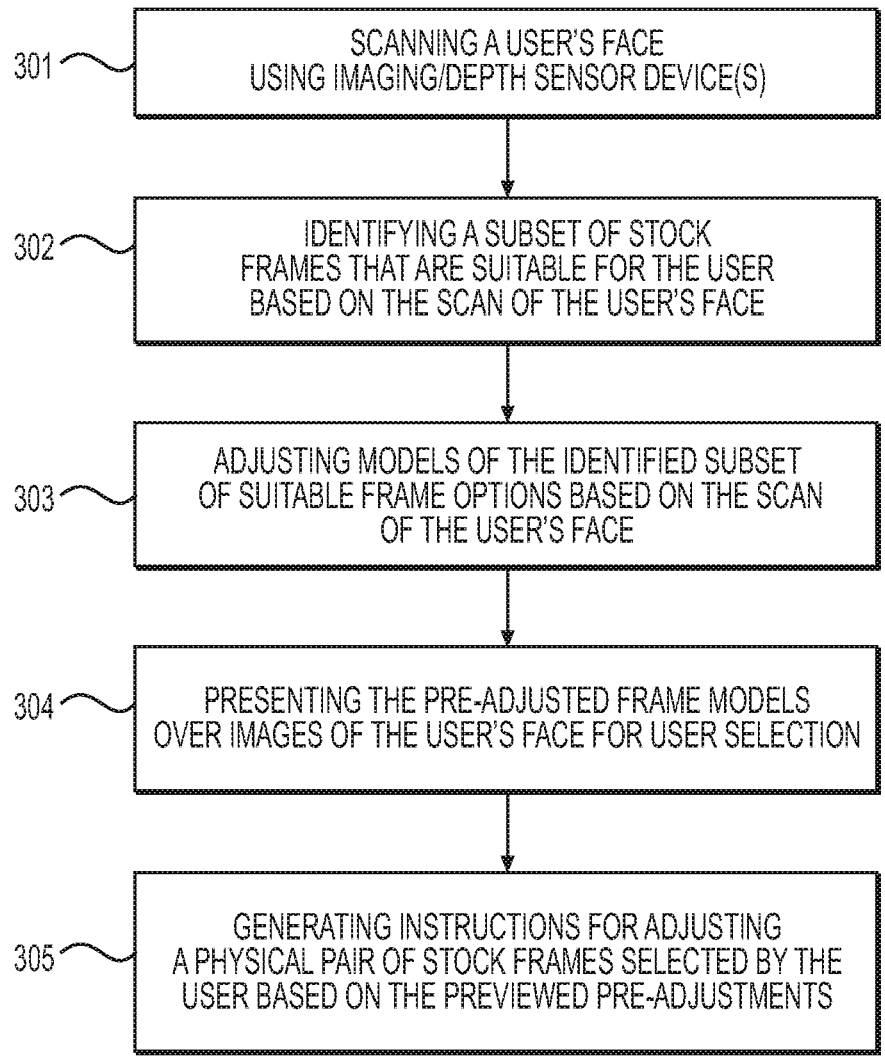
FIG. 3 depicts a flowchart of an exemplary method of generating instructions for adjusting and previewing stock eyewear frames, according to an embodiment of the present disclosure.

FIG. 3 depicts a flowchart of an exemplary method of generating instructions for adjusting and previewing stock eyewear frames, according to an embodiment of the present disclosure. As illustrated in FIG. 3, an exemplary method may include one or more of the below steps. In step 301, the method may include scanning a user's face using imaging/depth sensor device(s). In step 302, the method may include identifying a subset of stock frames that are suitable for the user based on the scan of the user's face. In step 303, the method may include adjusting models of the identified subset of suitable frame options based on the scan of the user's face. In step 304, the method may include presenting the pre-adjusted frame models over images of the user's face for user selection. In step 305, the method may include generating instructions for adjusting a physical pair of stock frames selected by the user based on the previewed pre-adjustments.

Figure 4A:
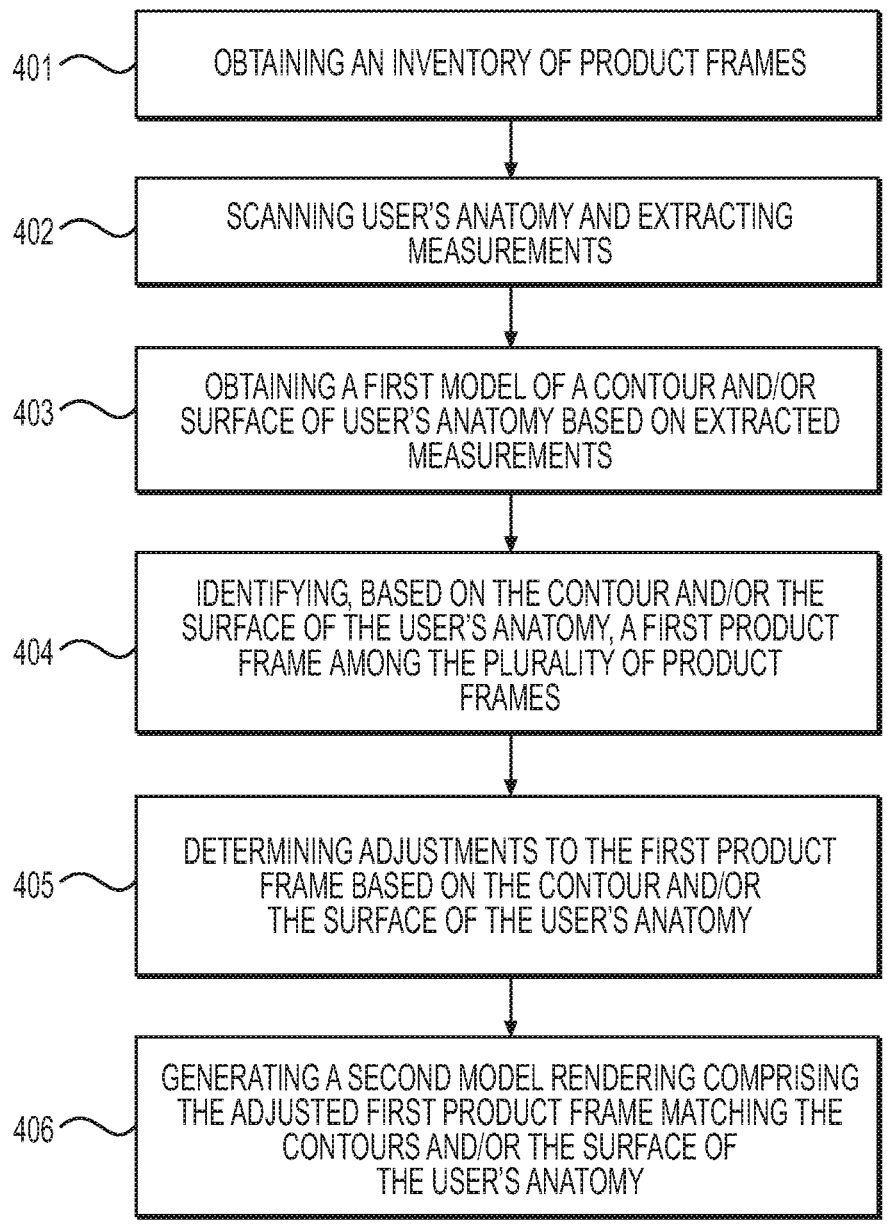
FIG. 4A depicts a flowchart of another exemplary method of modelling a human face and eyewear frames to produce a customized stock frame product, according to an embodiment of the present disclosure.
Figure 4B:
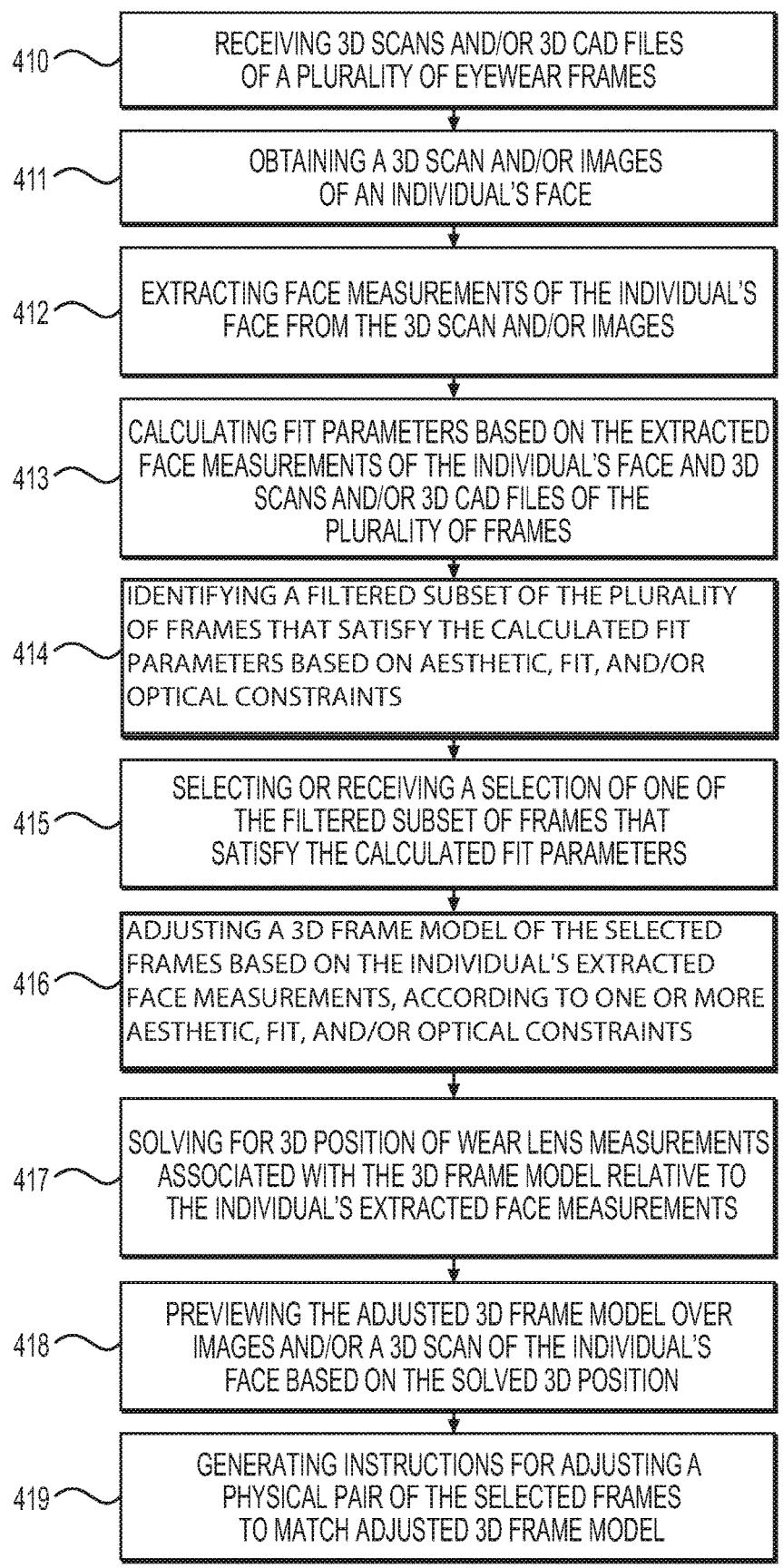
FIG. 4B depicts a flowchart of an exemplary method of generating instructions for adjusting and previewing stock eyewear frames, according to an embodiment of the present disclosure.

FIG. 4A depicts a flowchart of another exemplary method of modelling a human face and eyewear frames to produce a customized stock frame product, according to an embodiment of the present disclosure. As illustrated in FIG. 4A, an exemplary method may include one or more of the below steps. In step 401, the method may include obtaining an inventory of product frames. In step 402, the method may include scanning user's anatomy and extracting measurements. In step 403, the method may include obtaining a first model of a contour and/or surface of user's anatomy based on extracted measurements. In step 404, the method may include identifying, based on the contour and/or the surface of the user's anatomy, a first product frame among the plurality of product frames. In step 405, the method may include determining adjustments to the first product frame based on the contour and/or the surface of the user's anatomy. In step 406, the method may include generating a second model rendering comprising the adjusted first product frame matching the contours and/or the surface of the user's anatomy FIG. 4B depicts a flowchart of an exemplary method of generating instructions for adjusting and previewing stock eyewear frames, according to an embodiment of the present disclosure. In step 410, the method may include receiving 3D scans and/or 3D CAD files of a plurality of eyewear frames. In step 411, the method may include obtaining a 3D scan and/or images of an individual's face. In step 412, the method may include extracting face measurements of the individual's face from the 3D scan and/or images. In step 413, the method may include calculating fit parameters based on the extracted face measurements of the individual's face and 3D scans and/or 3D CAD files of the plurality of frames. In step 414, the method may include identifying a filtered subset of the plurality of frames that satisfy the calculated fit parameters based on aesthetic, fit, and/or optical constraints. In step 415, the method may include selecting or receiving a selection of one of the filtered subset of frames that satisfy the calculated fit parameters. In step 416, the method may include adjusting a 3D frame model of the selected frames based on the individual's extracted face measurements, according to one or more aesthetic, fit, and/or optical constraints. In step 417, the method may include solving for 3D position of wear lens measurements associated with the 3D frame model relative to the individual's extracted face measurements. The 3D position may be solved for based on fewer than all of the wear lens measurements and/or lens or frame information. For example, the 3D position may be solved for based on one or more points of the model. In step 418, the method may include previewing the adjusted 3D frame model over images and/or a 3D scan of the individual's face based on the solved 3D position. In one embodiment, the preview of the adjusted 3D frame may be different from (i.e., less adjusted than) a solved for model to be adjusted (so there are two different models; one used for preview and one used to instruct adjustment). For example, it may be beneficial to avoid previewing compression. Alternatively, the adjusted 3D frame can be adjusted only in terms of how it is rendering on the face model/images, for example by turning off occlusion based on camera views or using multi-path rendering or other techniques known in the art. In other words, the model might still intersect the face but is rendered so it does appear to intersect with the face. In step 419, the method may include generating instructions for adjusting a physical pair of the selected frames to match adjusted 3D frame model.

The exemplary method of FIG. 4B may further include anonymously aggregating calculated fit parameters of a plurality of individuals to optimize physical and digital inventory of eyewear frames and/or optimizing designs of frames generated by manufacturers. The method may further include adjusting the 3D frame model of the selected frames based on the individual's extracted face measurements by performing a sophisticated and intelligent non-rigid transformation of the eyewear frames to the face measurements. The method may further include adjusting the 3D frame model of the selected frames by adjusting parameters associated with one or more of: the front frame curvature of the frames, the nosepads of the frames, and the ear bends and/or temple splay of the temples of the frames. The method may further include obtaining the 3D scan and/or images of the individual's face using a mobile application of a mobile device of the individual or an embedded browser of a computing device in communication with a depth sensor. The method may further include generating instructions for adjusting selected frames by generating a plurality of adjustment deltas between a stock version of the selected frames and the adjusted version of the 3D frame model. The method may further include generating instructions for adjusting the physical pair of the selected frames by generating a plurality of views or cross-sections including one or more of top, bottom, front, and side views of the adjusted version of the 3D frame model.

Figure 5A:
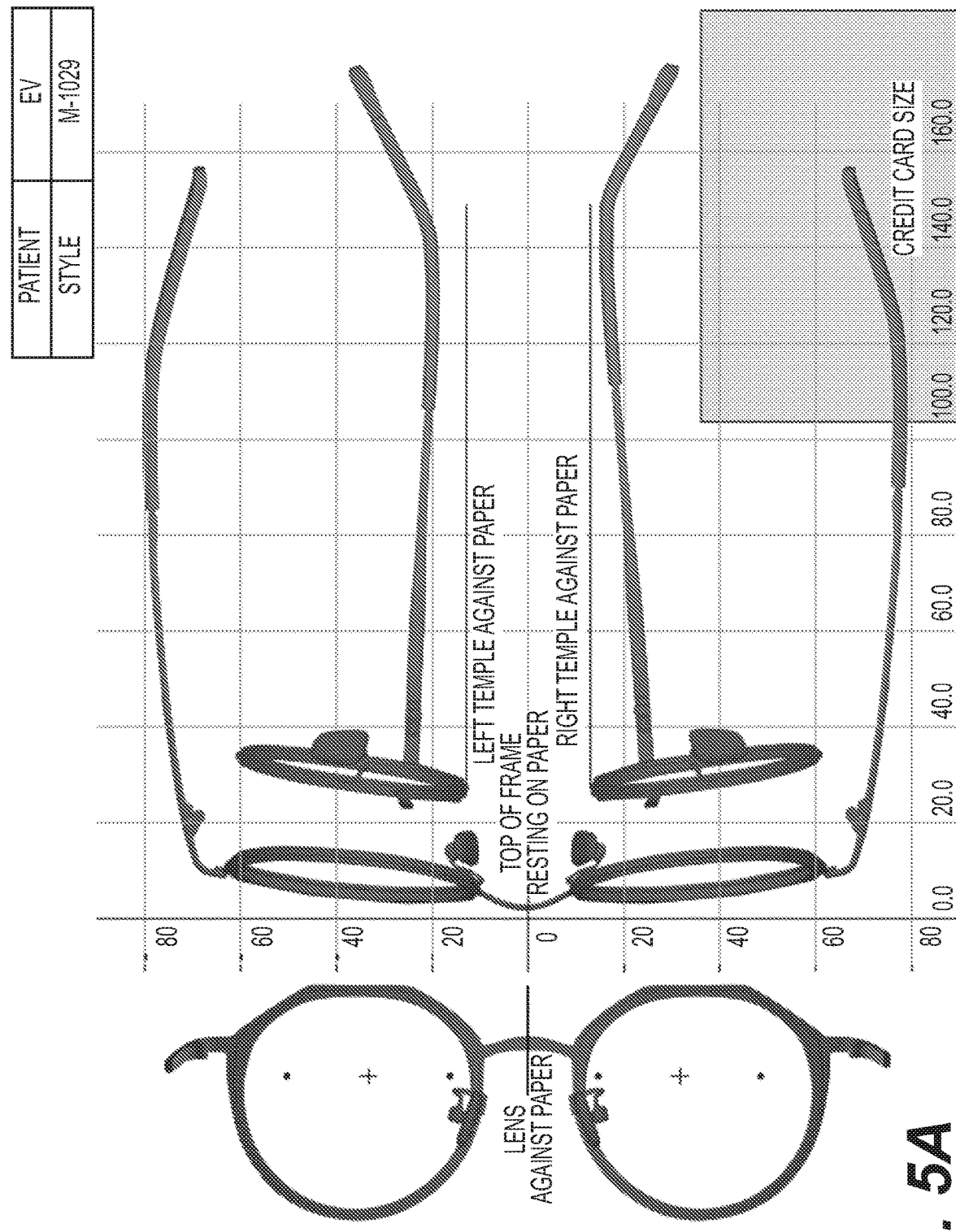
FIG. 5A depicts example instructions for adjusting a stock frame style for a first customer, according to an embodiment of the present disclosure.

FIG. 5A depicts example instructions for adjusting stock frames for a stock frame style for a first customer, according to an embodiment of the present disclosure. In eyewear manufacturing, where the same stock eyewear frame is made in batches of hundreds to tens of thousands, it may be important at the end of the line to be able to ensure consistency across the lot (and lot to lot). Systems and methods of the present disclosure may accomplish this by creating for each shape being produced (or unique SKU, which is the combination of shape and color) a 1:1 scaled engineering drawing that displayed a number of carefully-selected views or cross-sections. The manufacturer may print these schematics out at 1:1 scale, and physically uses them to quality-check the eyewear being produced. For purposes of demonstration, FIG. 5C reflects the eyewear adjustment instructions of FIG. 5A but in a 1:1 scaled engineering drawing printed on 8.5" by 11" paper, for example. The physical eyewear may be laid down over the various views shown in said drawing, and any deviation from said drawing is adjusted by hand (or by hand-tool or machine) such that the final product aligns to the drawing. This visual conveyance of an enormous amount of information is efficient and easy for line operators to be trained to follow. It is not necessary to have any text—it may be purely visual. The simple instruction is to adjust each product such that it matches the drawing. This ease of understanding, this simplistic method of visual verification, this high-bandwidth means of communication, lends itself not only to mass-manufacturing leveraging low-skilled labor, but it results in a high-degree of repeatability and reproducibility.

Referring to FIG. 5A, to ensure when printing-out said schematic that the margins are setup correctly to achieve 1:1 scale, or when digitally displaying it in a paperless setup, a calibration target (an object of known size) can be included/ rendered in the schematic to be used as a test of the printer/display scale. For example, a rectangle with the precise size of a credit card can be included, so any printed or displayed schematic can be spot-checked against a credit card to ensure the schematic was printed correctly. After a proper scale is obtained, the frames may be adjusted by placing the frames in four different positions and adjusting the frames to match the instructions. For example, the frames may be placed with the lens against paper, with the top of the frame resting on the paper, with the left temple against the paper, and/or with the right temple against the paper. The numbers on the axes may refer to millimeters (mm). Once the adjustments are made, the frames will fit the first customer. Additional information can be rendered into the schematic in order to deliver added sources of context or value to the optician. For example, information related to the order can be written into a table, such as customer name, frame model, frame color, SKU number (of the retailer, or of the manufacturer, or both), order date, version number (of the algorithm generating the drawing or running the fitting, etc), etc. Such information can be human-readable, or conveyed via a 1D or 2D barcode. If the schematic is digitally displayed, such info could be contained behind a hyperlink contained in the schematic.

The optical measurements useful for ordering, edging, and mounting Rx lenses can also be included in a table in the schematic (or found behind a hyperlink). This can include information for the left and right eye, and for each eye can include, but is not limited to, the near pupillary distance, far pupillary distance, optical centration height, segment height, corridor length, etc. This can also include measurements of the frame needed for selecting the correct lens blank size, such as the A, B, DBL, and ED. Furthermore, the minimum blank size can be calculated and included. Additionally, information relating to the Rx can also be included, including but not limited to, power, cylinder, axis, prism, add power, base curve, lens index, lens material, etc. Additionally, 3D position of wear measurements, needed for digitally-surfaced progressive lens designs, can be included, such as vertex (for each eye), pantoscopic tilt, and frame front wrap angle. Information regarding how a lens should be edged can also be included, such as if it should be beveled or grooved, where to position said bevel, inclination angle of the edge, etc. Also how the schematic assumed how the bevel/groove would be positioned relative to the front surface of the lens can be included, such as follow-front, 33/66, 50%, etc.

In additional to textual conveyance of the aforementioned information, the optical centration of the left and right lens can also be visually displayed/overlayed on various rendered eyewear views in the schematic. In addition to the optical center marks (for a single-vision lens), marks for progressive lenses can also be included, such as the fitting cross/fitting reference point, the prism reference point, distance power checking circle, horizontal alignment lines, near power checking circle, alignment dots, etc. Even the lines that covey the unusable areas of a progressive design (signifying the borders of the peripheral distortion areas) can be superimposed on the schematic. Any permanent or temporary mark used in the lens manufacturing line can be rendered.

According to one or more embodiments, conveying the optical measurements, both textually and visually, may be useful. First, it ensures a central and dense source of truth for an order. Secondly, many retailers do not perform their own edging and mounting of lenses, so this adjustment schematic can serve as a visual confirmation that a lens was properly edged and mounted into a frame prior to the frame being picked-up by a customer or shipped to their home. Errors can be caught and corrected prior to delivery to a customer, so the customers' first experience with their new eyewear is as flawless as possible.

By observing conservation-of-volume, as a temple is lengthened (the ear bend is moved towards the tip), the portion behind the ear should get shorter, and vice versa. One or more embodiments of the present disclosure may determine how ear bends are adjusted in order to ensure the adjustment instructions are physically-accurate, so by laying a frame down on the schematic the temples may be checked down their length and the tips should still match up.

Figure 5B:
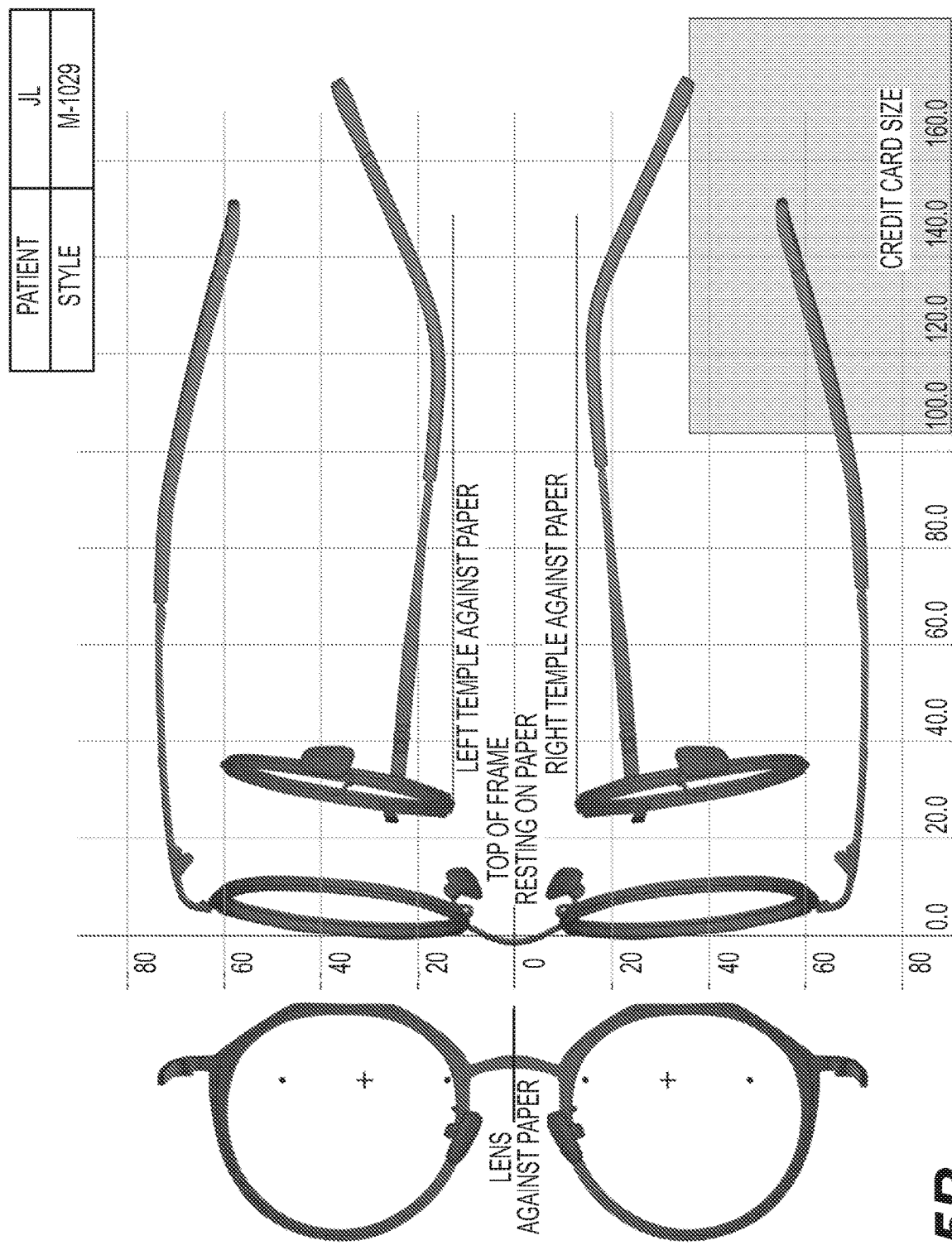
FIG. 5B depicts example instructions for adjusting the stock frame style for a second customer, according to an embodiment of the present disclosure.
Figure 5C:
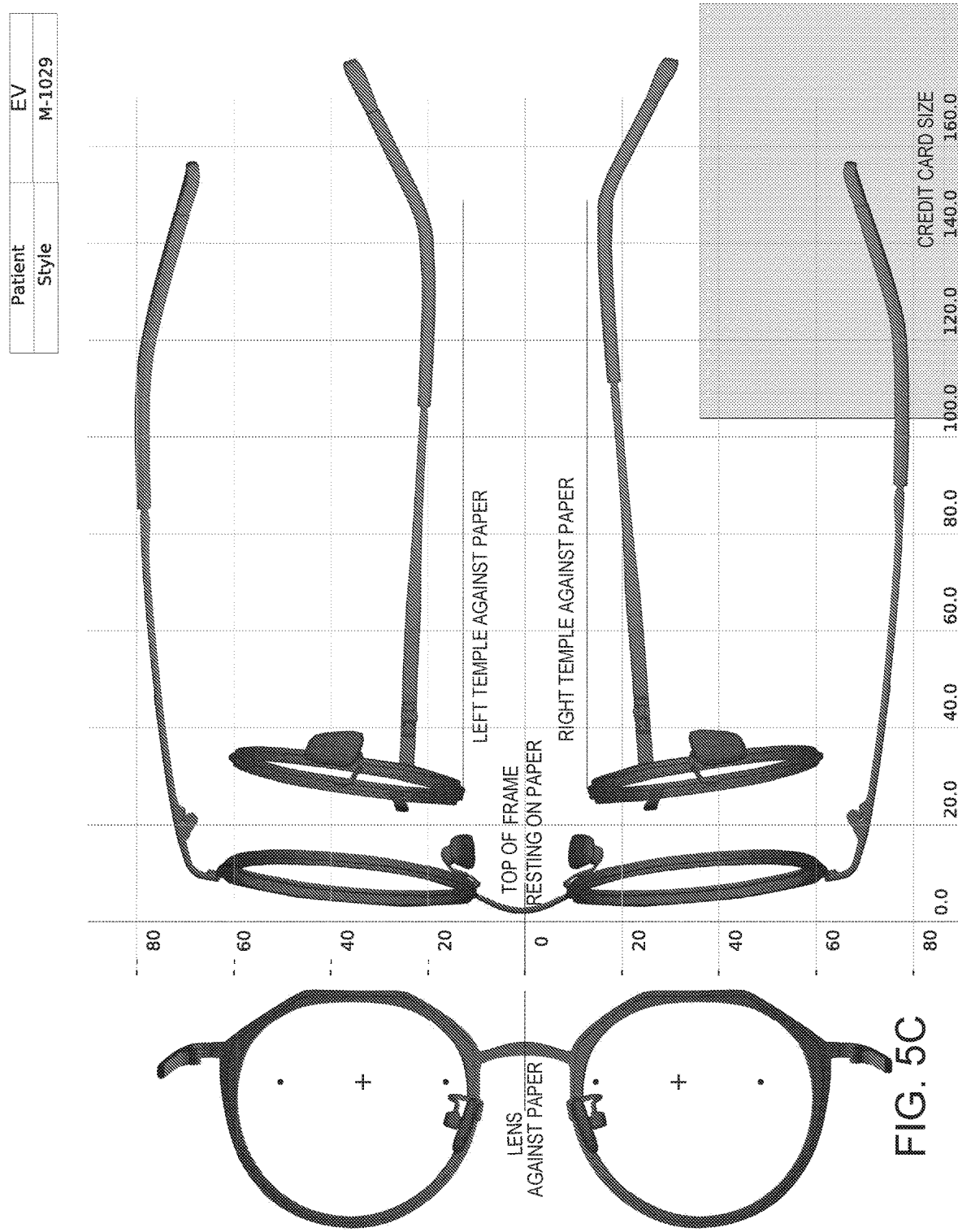
FIG. 5C depicts a 1:1 scale version of the example instructions from FIG. 5A for adjusting the stock frame style for the first customer, according to an embodiment of the present disclosure.

FIG. 5B depicts example instructions for adjusting the stock frame style of FIG. 5A for a second customer, according to an embodiment of the present disclosure. As illustrated in FIG. 5B, the adjustments are slightly different than the adjustments to the first customer instructions of FIG. 5A. The frames may be placed in several different positions and adjusted to obtain the correct fit. To obtain the proper scale, a credit card may be used to compare to the gray box in the bottom right corner. After a proper scale is obtained, the frames may be adjusted by placing the frames in four different positions and adjusting the frames to match the instructions. For example, the frames may be placed with the lens against paper, with the top of the frame resting on the paper, with the left temple against the paper, and/or with the right temple against the paper. Once the adjustments are made, the frames will fit the second customer.

Figure 5D:
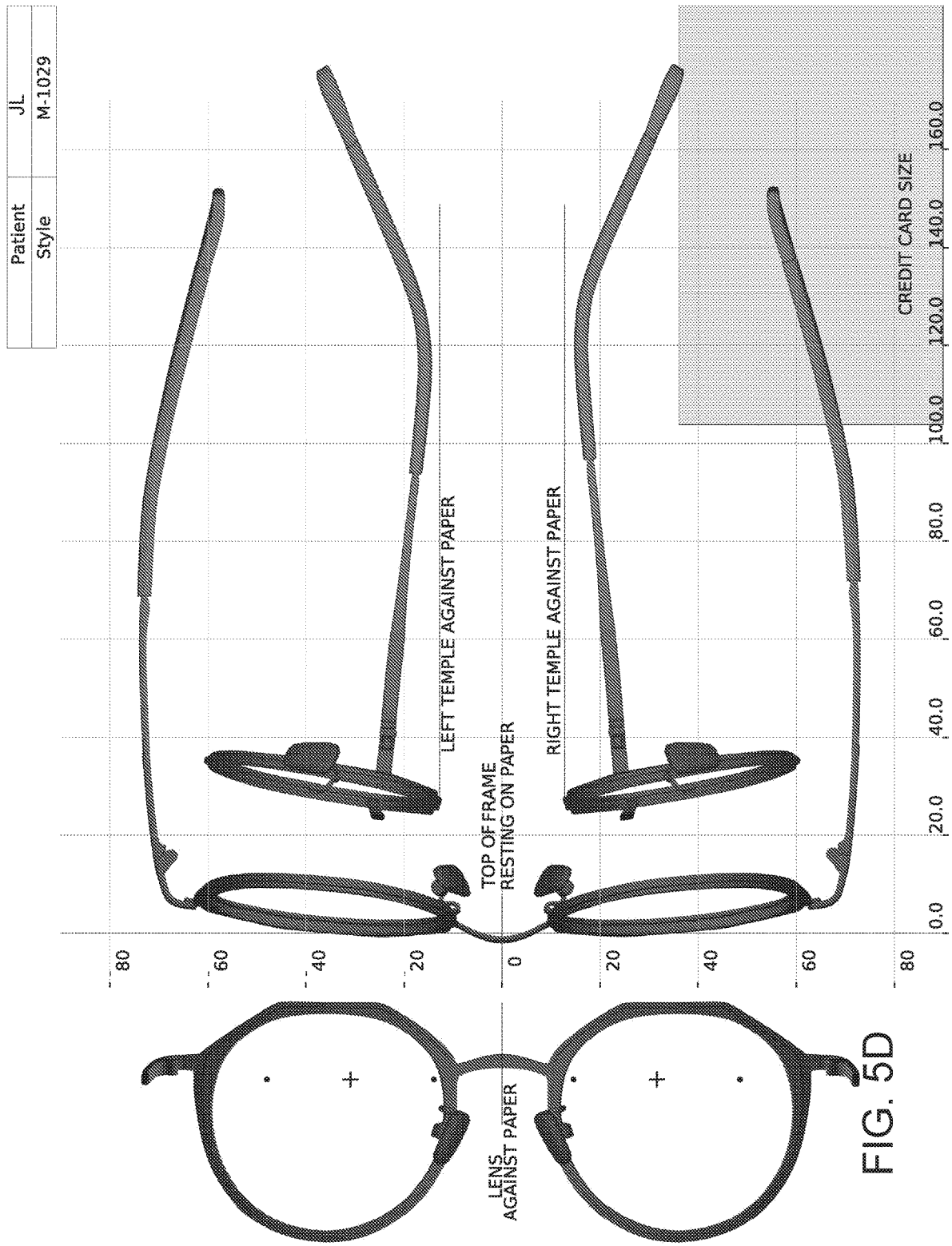
FIG. 5D depicts a 1:1 scale version of the example instructions from FIG. 5B for adjusting the stock frame style for the second customer, according to an embodiment of the present disclosure.

One or more embodiments may support textual conveyance of information, but embodiments may go further by leveraging this method used in mass-manufacturing and extending it such that it can support the one-off and adjustments for adjusting a stock frame to fit a unique individual. Systems and methods of the present disclosure may generate a unique schematic which is also 1:1 scale that shows the post-adjusted eyewear from a number of carefully-selected (yet consistent) views or cross-sections. For purposes of demonstration, FIG. 5D reflects the eyewear adjustment instructions of FIG. 5B but in a 1:1 scaled engineering drawing printed on 8.5" by 11" paper, for example. Systems and methods of the present disclosure, which may distort a 3D mesh in order to render it photo-realistically on a face, can also take said modified 3D model (now custom to the individual), and use it to render said schematic with any number of viewpoints, since the input is a 3D asset (though unique to the individual).

According to one or more embodiments, generation of an "adjustment instruction" may be automated to achieve the business needs of low-cost, instantaneous turn-around, and scale. Said generated schematics may be specific to a given frame and a given face. Since systems and methods of the present disclosure may include virtual try on following a set of rules during rendering that shows how frames would be adjusted by a professional to fit, said schematics may be a perfect visual guide for how professionals should adjust said frames to fit. The rules may bend components where opticians would bend a frame to fit, while ensuring via a set of rules that adjustments are not conveyed that cannot be done in the physical world (i.e., cannot be physically done, or doing so would result in frame breakage).

Different views of the eyewear may be used to convey different types of frame adjustments. A bottom-up view, coupled with a side view, are good to show how to manipulate adjustable nosepads to achieve the desired fit. A top-down or bottom-up view may convey how temples should be splayed inwards or outwards to account for head/ear width, as well as ear-bend placement (lengthening and shortening of temples). A side view is also complementary in aiding temple length, and by leveraging cross-sections a view of just the left temple (without interference/confusion from the presence of the right temple) allows clarity of the adjustment intent via the view. Eyewear can be rendered from any virtual camera position and field-of-view in order to create consistent views that are clear in their intent, and components may be hidden in certain views in order to aid in clarity by removing extraneous objects that are distracting or occlude the objective.

Additionally, a camera position used to render a view can also be custom to the specific adjustment-instruction (specific to the fit solution for a given frame and a given face): rather than render the eyewear from a plane that is in the coordinate system of the unadjusted eyewear (unrelated to the face), a plane may be created that is a simulation of a table that would contact the post-adjusted frame if it were laid upside-down on said table (contacting the top of the frame front, and the tops of ear-bends for one temple (both if said temples are symmetric and mirrored, but in the case of asymmetry, only one would contact the table and the other would float in air)). Such a viewpoint would be precisely the viewpoint of the optician in reality when they have successfully adjusted the eyewear as intended, and the schematic may serve as a mirror-reflection of the frame resting upon it. A "virtual plane" may also be used in other rendered views as a dotted-line used to visually-convey the necessary asymmetric adjustment of temple drop of one temple relative to the other.

According to one or more embodiments, views, along with visual or textual callouts, may also aid in minor adjustments, such as an increase or relaxation of frame pantoscopic tilt or front frame wrap.

According to one or more embodiments, images of glasses may be solid fill, wireframe, outline line drawing, etc. Any number of ways to render them in order to provide best conveying of context and intent. Furthermore, they may be rendered in color, greyscale, and/or black and white. And if larger paper can be loaded in a printer, they can be rendered 1:1 to larger paper sizes, to take advantage of larger paper real estate (e.g. A4, A3, A1, A1, A0 paper sizes). Furthermore, said instructions, saved as a PDF or other digital format, can also be used in a paperless fashion: a monitor or tablet computer can be laid flat on a table facing up (or mounted under glass) and then it can digitally render the schematic without need for printing it out in physical form, assuming the display settings are confirmed to display the schematic at 1:1 scale.

The present embodiments may facilitate opticians and lab technicians in measuring these factors based on the scan of the customer's (face) anatomy, and adjusting stock frames to ensure a fit. Exemplary adjustments that may be made based on a scan of the customer's anatomy may include: angling nose pads depending on a scan of the customer's nose, bending temples to a more acute or obtuse angle depending on the scan including the customer's ears, bending or adjusting a hinge to center or enhance optics depending on a customer's eye placement or location of the customer's eye in each lens, etc.

For example, comfort of an eyewear's nose pads positioned on a customer's nose may be achieved if the two contact surfaces are aligned properly and mate such that there are no high pressure-points and if the eyewear is naturally supported in the proper position by the nose. The present embodiments may include instructions and schematics to automatically aid an eyewear professional (e.g., a lab technician or optician) in matching a stock frame eyewear model's nose pads to the scan of a customer's face. For instance, a user interface for the professional may include displaying nose pads of the stock frames with a highlighted color (e.g., yellow) and permitting the professional to overlay the frame against a 3D scan of a given customer's face. In one embodiment, the highlight color may change (e.g., from yellow to green) once the nose pads are properly alighted with the scan. The glasses for the given customer may then have (or be modified to have) nose pads positioned based on the nose pad position at which the nose pads of the interface were highlighted green, for instance. The interfaces may further include visual or audio instructions, e.g., "please align nose pads to scan until nose pad indicators turn green."

Customization Prior to Placement on Anatomic Scan a. Optical Measurements

According to one or more embodiments, pre-adjustment of frames in the virtual-try on may provide a better preview, allow for adjustment instructions in order to deliver a frame that fits out-of-the-box to a customer's home, and allow for dispensing optical measurements from such a platform. Understanding how a frame can and will be adjusted to fit, and previewing how it will be positioned on the face in a photorealistic and physically-accurate manner, means all 3D position-of-wear measurements may be derived, as mentioned herein.

According to one or more embodiments, understanding the 3D shape of the nosepads, and how the surface will contact and rest on the 3D shape of the patients' nose, may be an important input to solving for optical height and/or segment height for optics. Solving for the contact surface determines optical placement for a given frame position on the face, and various fitting rules around desired optical height ratios, distance from face, ideal pantoscopic angles, etc. dictates which valid solution is the ultimate one previewed and recommended. In addition, ensuring maximum contact surface area, or closeness of the matching of the angles of the frame nosepad surface to that of the patient's nose, can result in additional benefits of enhanced comfort by distributing the weight over a larger surface area (resulting in lower pressure), as well as less slippage due to a "friction lock" between like surfaces. Rather than resting on a point or an edge, which on an oily nose can cause slippage like skis down slick snow, distributing the contact over a large area can result in additional friction, as well as a friction lock similar to induced vacuum or "wringability" which is when two very flat surfaces attract each other (similar to how two very smooth and flat gauge blocks can adhere without external forces applied). There can be a pressure threshold as part of a fit and/or filtering algorithm that take into acct surface contact and eyewear weight, where eyewear weight is the combination of the frame and each individual lens weights. Weight of an Rx lens can be precisely calculated once one knows as input the lens base curve, lens shape, Pd, OC height, and Rx.

According to one or more embodiments, head tilt and/or determined natural head posture, may be solved by the system during the scanning process by comparing the six degrees of freedom of the scanning apparatus relative to the face being scanned. So once the face is scanned and in a coordinate system, the natural head posture can be determined from the camera matrices that dictate the 6 degrees of freedom of the camera relative to the face, and the inertial measurement unit sensors (IMU) comprising of 3 or 6 axis gyroscopes and accelerometers that can determine face to world orientation. Additionally, landmarks of the environment (with or without a calibration target) may further solve for orientation accuracy of the scanning device in the world environment, aiding in understanding patients' natural head posture (which is the pitch of the head relative to the direction of gravity (down).

Natural head posture, or head tilt, as well as head roll, can be refined by an optician or user by providing them a visual interface to rotate the head (in 3D or 2D) until what is displayed on screen relative to the XY coordinates on screen (Y representing down if the display is in portrait mode) is desired. This offset can be stored and recalled later, or the entire face mesh can be re-registered so all vertices are in this new coordinate system.

Head roll is important for determining if the eyes will have the same optical centration height (OC height) for left and right eyes, or if they should be different. For most patients, they should be symmetric, but to account for some rarer occurrence of face asymmetry, enabling optician overrides can be advantageous.

Once head pitch, or natural head posture, is determined, then an accurate pantoscopic tilt and optical centration heights can be determined and can be used to solve for all other aspects of lens centration measurements.

Vertex distance may be calculated in 3D, and the distance from the pupil surface to the lens back surface can be precisely calculated. If there is desire to measure to the back of the lens surface given how that lens surface can change for positive power Rx's, this can be precisely calculated given frame wrap, pantoscopic tilt, lens index, Rx power, Rx cylinder, axis, minimum edge thickness, and lens outer perimeter shape, or effective diameter (ED), or minimum blank size.

In one embodiment, a computer system may obtain a scaled scan or scaled face model that has key facial features identified, including but not limited to dimensions, points, lines, and surfaces of the eyes, nose, ears, brow, etc. The computer system may also obtain a configurable eyewear model or a stock eyewear product that has key features identified, including but not limited to dimensions, points, lines, and surfaces of the temples, nose pads, lenses, bridge, etc. The computer system may perform an optimization of the configuration product model parameters to reduce the error between various features of the face and eyewear model based on predefined fit metrics, such as the optimal ratio of eyewear width to face width, the optimal centering of eyes within lenses, etc.

For example, interfaces and schematics of the present system may help an eyewear professional adjust the angle of the temples until the error between the temples and top of the ear are minimized. The computer system may optimize the fit and style based on other techniques, such as prompting inputs or adjustments from an eyewear professional, machine learning or analytic equations. The computer system may update the eyewear model with new parameters, for post-processing/adjustments after manufacturing or even for manufacturing the eyewear model. The computer system may perform an optimization to obtain a rigid transformation, to align the eyewear model to the face scan or model. The error between key features of the product and face may be minimized, and some features are weighted more than others. The computer system may transform coordinates of the eyewear model to align it with the anatomic scan/model, thereby placing a new eyewear design aligned with the customer's anatomy.

b. Customization after Placement on Anatomic Scan

A computer system may obtain a scaled face model that has key facial features identified, including but not limited to dimensions, points, lines, and surfaces of the eyes, nose, ears, brow, etc. The computer system may obtain a configurable eyewear model that has key features identified, including but not limited to dimensions, points, lines, and surfaces of the temples, nose pads, lenses, bridge, etc. The computer system may perform an optimization to obtain a rigid transformation to align the product model to the face. The error between key features of the product and face may be minimized, and some features are weighted more than others. The computer system may transform coordinates of the eyewear model to align it with the anatomic model. The computer system may analyze the interactions and dimensions and errors between the product model and anatomic model.

For example, the computer system may detect that an eyewear model sits too low on a customer's nose. The computer system may then automatically adapt the eyewear model or prompt a customer to adjust the eyewear model by adjusting nose pads, temples, hinges, etc., to provide a better fit for the customer. As another example, the computer system may detect that the customer's face is crooked relative to the eyewear model. The computer system may twist the eyewear model, adjust the temples, and nosepieces to ensure a better fit for the customer and minimize errors between the facial features and product features based on predefined fit metrics, such as the optimal ratio of eyewear width to face width, the optimal centering of eyes within lenses, etc. The resulting fit model may be better designed for the customer. Specifications of the resulting fit model may be provided to an eyewear professional to ensure that stock frames are pre-adjusted to fit a customer.

Custom Fitting

Systems and methods of the present disclosure may rely on a 3D scan of a face for the purposes of the virtual try-on, but it may also work if provided facial measurements that are derived from said 3D face—that is, if said measurements were captured for a face without the actual capture of a 3D model, systems and methods of the present disclosure would still be able to perform for the purposes of solving for optical centration, frame fitting, and adjustment instructions. Similarly, algorithms of the present disclosure may derive all measurements of a frame from a 3D asset, but if said measurements were provided directly without said asset, the system may not be able to render said asset; however, the system could solve for filters, fit, optical centration, and textual adjustment instructions.

The methods for achieving 3D assets for frames can be broken down into two methods. First, methods and systems may leverage 3D design files that manufacturers already create as part of their design and manufacturing process. Methods and systems may place a few 3D points on the 3D asset (manually, or automatic detection) in order to power a fitting, and surfaces may be identified as inputs to the fitting algorithm as well (for the purposes of maximizing nasal or temporal surface contact, etc). Additionally, physical frames may be 3D scanned in order to have the 3D information necessary for rendering and in order for them to be leveraged by a platform and downstream methods of delivering value described herein. 3D points may be used to power not only filtering (which frames should be recommended as matching a filtering criteria, which could take into account aesthetic preferences as well as fit criteria), but also where and how frames should be adjusted to fit (for the purposes of a virtual try-on, and for downstream adjustment instructions). Said 3D points may also be used to derive frame and/or lens measurements, such as A, B, DBL, temple length, frame wrap, base curve, ED, etc. Said 3D points placed on a 3D eyewear frame can also dictate where and how components can move relative to each other in order to adjust to as-worn and post-adjusted condition, such as the pivot point of the temples relative to the frame front (and whether they have spring hinges).

Numerous Fit Solutions for Stock Eyewear

The number of fit solutions for stock eyewear may be finite for acetate frames, as the nosepad surfaces are fixed. However, for metal frames, significant adjustment of the adjustable nosepad arms can allow for optical and aesthetic considerations to play a more dominate role in determining which of the numerous fit solutions should be the ultimate one selected. Some inputs that can affect the fit rules are ideal optical and aesthetic consideration of eye positioning (horizontally and vertically within the lens opening), ideal distance of the frame from the brow, ideal nose contact surface, adjustability limits of the temples' length and splay, pantoscopic tilt optical and aesthetic considerations, avoidance of cheek and eyelash contact, minimum vertex distance, etc. Many of these must be recalculated due to changes to the lens base curve, dictated by optical requirements and the methods available for placing the bevel around the perimeter of the lens (follow front, 33/66, 50%, etc, which determines the effective base curve, which can deviate from the front or rear base curve based on how the lens will sit in the frame).

The computer may analyze a set of measurements between the quantitative anatomic model and eyewear model. An exemplary set of measurements includes but is not limited to: Width of eyewear relative to width of face; Distance between nose pads relative to width of nose; Angle, shape, or size of nose pads relative to angle, shape or size of nose; Length of temples relative to ear position; Height of eyewear relative to height of face; Height of each ear with respect to the eyes or other reference points; Distance between lens centers and eye centers; Vertex distance from inside lens surface to pupil; Outward angle of temples relative to frame; of lenses relative to the plane created by the front of the face; Eyewear wrap angle vs corresponding wrap curvature of the face. These measurements may be constrained against the dimensions or the stock eyewear model. In other words, since stock eyewear is being used, only some parameters may be adjusted. More flexibility may exist for lens parameters, which are custom made.

The computer system may use these measurements to optimize a configurable eyewear model to the customer's face. The automatic adjustment may be informed by default metrics, such as optimal values for a ratio of eyewear-to-face width. Each metric may comprise a dimensionless ratio that scales properly across all customer faces, a specified dimension (e.g., vertex distance), a range of optimal values, etc. Each metric may be optimized individually, or optimized together if there is an interaction effect, such as the interaction effect between eyewear frame width and temple angle.

Lens Thickness Rendering

Systems and methods of the present embodiment may solve for all lens optical measurements, rendering lens thickness for all prescriptions. In the retail and e-commerce context, this may help to avoid buyers-remorse as well as provide sophisticate sales-support tool to facilitate the conversation surrounding various index of refraction lens options.

Positive sphere Rx may be challenging to the fact that the optical center of the lens is the thickest point, so to render a not-overly thick minimum edge thickness (which drives center thickness), it may be necessary to have very good means of determining ALL the optical centration measurements, and a sophisticated means of understanding the lens perimeter shape in 3D as well as a means to derive effective diameter (which is not often supplied by a manufacturer). But once all measurements are in hand, simple math, trigonometry, linear algebra, and advanced rendering techniques make this possible.

According to one or more embodiments, in addition to rendering lens thickness, using advanced rendering techniques such as ray tracing, path tracing, raymarching, etc., the refraction of the lens can be rendered. This means that the distortion may be rendered that occurs as light passes through not just an Rx lens, but also as light passes through transparent or translucent frame materials. The result, with respect to the frame, results in an enhanced photorealism of the virtual rendering, making it indistinguishable from a physical try-on, except that it can be done remotely, or on an expanded set of inventory of shapes or colors than that which a store can carry in-stock. But when coupled with physically-accurate lens rendering, the virtual result is better than a physical try-on, since the system may render what the Rx lens will look like on a face before it has been manufactured. This may aid in sales support conversations around Rx lens options, and avoid buyers-remorse that can occur when a customer with a strong Rx lens selects a frame that results in a thick and heavy lens even when high-index materials are used.

Additionally, one or more embodiments may render various lens coating options, such as various anti-reflective coatings to aid in sale support, as well as any number of tint and mirror options for Rx and plano sun lenses.

Additionally, one or more embodiments may, by running lens mapping algorithms (progressive lens design algorithms), design a custom lens design for an individual, and render the actual lens distortion of that digital design, helping to convey to the customer the reduced peripheral distortion, or wider corridor, or one digital lens design over another. Or the tradeoffs between soft or hard lens designs, across lens design vendors, as well as enhance the sale consultation and journey around such a lens purchase.

Optimal values may vary based other factors entered by the customer or determined from the image data, such as gender, age, face shape, eyewear style, purpose of eyewear, or what is currently fashionable. For example, eyewear for recreational use may prefer increased frame wrap and a tighter temple fit to reduce wind in their eyes, widen their field of corrected vision, and/or provide more impact or sun protection. Customers choosing plastic eyewear may prefer larger eyewear than customers choosing metal eyewear. These customer-defined preferences may be used to alter the optimal parameters during the customization process.

The fitting and adjustments may include systems and methods for generating an eyewear frame and lens geometry that is customized to a customer's anatomy and optimized for optical performance. For instance, the present disclosure may include systems and methods for generating eyewear for a specific individual. For example, the present disclosure may include systems and methods for producing customized eyewear by constructing a customer's multi-focal or progressive lenses and frames in accordance with the customer's anatomy and optimized for optical performance. For example, the frames may be shaped to align with, or mold or contour relative to a customer's facial anatomy. In one scenario, the present disclosure may include generating or receiving a scan or model of the customer's anatomy (e.g., facial anatomy), and building a configurable parametric model of eyewear frames that form to geometric features of the model of the customer's anatomy.

In another example, the lenses of the eyewear may be shaped based on a customer's optical information. The present systems may provide user interfaces to facilitate eyewear professionals in adjusting lens parameters or the eyewear model to enhance or optimize optics of their eyewear. The interfaces may take professionals through a series of validations or visuals (e.g., as part of a workflow) to instruct and ensure that the professionals may generate a fit for the eyewear that and lens construction that yields good optics of the eyewear. Optical information may include information that contributes to producing or procuring the customer's ideal optical lens, e.g., prescription information (power, sphere, axis, centration, add power, positioning, etc.), lens type, lens material, lens tint, lens thickness, lens curvature, base curvature, lens size, optical design parameters (e.g., interpupillary distance for distance viewing, interpupillary distance for near vision, vertex distance, face wrap, eyewear and frame outline, segment height, optical height, etc.), corrective needs of the customer (e.g., correction for astigmatism or presbyopia), the customer's viewing habits, etc. In one embodiment, optical information may include information organized into multiple categories: information regarding how the lens fits in the frame (e.g., a change to the parametric frame may correspondingly adjust the parametric lens, information regarding the optical parameters of the lens (independent of the shape of the frame), information on the lens (independent of the frame), digital progressive lens design parameters or principles, "position of wear" variables (e.g., variables that are a result of how a frame fits on the anatomic features of a customer), compensations for change in vertex distance, compensations or adjustments for vertical prism imbalance, checks for sphere power, orientation of axes, fit of the lens inside of a frame, base curves, decentration, thickness, etc.

Information regarding how the lens fits in the frame may include one or more of the following: A size (width), B size (height), lens circumference, distance between innermost point of the edged/cut profile of the left lens shape to the innermost point on the profile of the edged/cut right lens shape (DBL), frame wrap/base curve, traced outline (e.g., an actual 2D or 3D shape of the edged/cut contours of the lens that may match corresponding lens holes in the frame, lens bevel or groove type (and dimensions), lens bevel or groove positioning within the edged thickness (side) of the lens (e.g., distance or percentage from front surface of lens, base curve of bevel (e.g., follow lens or deviations to ideal curve), etc.

Information regarding the optical parameters of the lens (independent of the shape of the frame) may include one or more of the following: prescription (e.g., power, sphere, axis, add power, etc.), lens type (e.g., single vision, bi-focal, tri-focal, progressive, etc.), centration (e.g., monocular interpupillary distance for distance viewing, monocular interpupillary distance for near viewing (e.g., reading), binocular interpupillary distance, etc.). Monocular interpupillary distance may include the distance from each eye to the center plane of the nose. Monocular near pupillary distance (as opposed to binocular interpupillary distance) may yield information as to how a customer biases their preferred reading position, e.g., with respect to the right and left eye. Some customers may be more right-eye dominant, and actually prefer to read an object to the right of center. Monocular Pd may capture this customer bias if it is measured while a customer is reading an object located at their ideal reading location, for instance.

Information on the lens (independent of the frame) may include one or more of the following: base curve, lens material (e.g., CR-39, polycarbonate, 1.60, Trivex, etc.), lens material index (e.g., 1.49, 1.56, 1.60, etc.), center thickness, lens coatings (e.g., anti-reflection, superhydroscopic, anti-scratch, anti-static, etc.), lens tinting, and/or other lens attributes (e.g., polarizing, photochromatic, blue light blocking, etc.).

Digital progressive lens design parameters or principles may include one or more of the following: progressive lenses may be expected to introduce unwanted peripheral distortion, certain lens designs may be optimized for various use cases in order to optimize the optical design for that use case at the expense of distortion in areas of the lens not used for that use case (e.g., a progressive lens for all-around use may balance the design for both distance and reading, and a progressive lens for mainly reading use may optimize the reading area at the expense of distance viewing, corridor length (e.g., length of the transition from distance to reading, where designs may be optimized to yield a lens when a long corridor is not possible (e.g., if the intended frame is not very tall)), etc.

"Position of Wear" variables may include one or more of the following: vertex distance (e.g., distance from back of the lens to the pupil as the lens is positioned in the frame and the frame on the face of the customer), pantoscopic tilt (e.g., the downward tilt of the lens as it is positioned in the frame and sitting on the face with respect to the pupil), frame wrap (e.g., the inward tilt of the lens as the lens is positioned in the frame and as the frame is positioned on the face), optical height (e.g., vertical distance from bottom of the lens to the customer's pupil or iris), segment height (e.g., for a bifocal or trifocal lens, the segment height may include the vertical distance from bottom of lens to top of the bifocal (or tri-focal) reading region. For a progressive lens, the segment height may include the vertical distance from the bottom of the lens to the starting point of the transition from distance to reading. This height may be adjusted based on the desired reading position of a customer, monocular distance (e.g., since left and right lenses may differ based on where a customer's pupils and/or irises are with response to the center of the customer's nose), etc.

Advanced "digitally-compensated" progressive lens designs can adjust the front and/or back surfaces of the lens in response to the "Position of Wear" variables, for instance, in order to optimize the optical performance of a lens (and reduce unwanted optical distortion) for a given frame and customer. But the compensation may be increased if the frame is adjusted to hold the lens in a non-optically-ideal position. There may be a limit to the amount of digital compensation that can be achieved. Certain frame shapes may restrict how well a resultant lens can optically perform. For example, too small of a B-size (e.g., a narrow height of a lens) may often does not allow for a large enough reading section for a bi-focal or progressive lens, or such a B-size may entail a very short progressive corridor length. Likewise, the more the frame wrap, the more distortion may be introduced (or the more digital compensation may be desired in order to reduce said distortion).

By allowing the parametric adjustment of a frame in response to a lens, the disclosed systems and methods may adjust the frame to position the lens on the customer's face with good optical performance. For example, the wrap and curve of a frame can be adjusted to correspond to an optimized optical design for a customer. In one exemplary case, the pantoscopic tilt of the frame can be adjusted to position the angle of the lens ideally, given how the frame may sit on the face and given the customer's preferred reading location. Alternately or in addition, the temple angles of the frame can be adjusted based on the base curve of the lens so the temples may be correctly positioned with respect to the customer's ears.

A customer's viewing habits may include a facial location at which the customer prefers to wear his or her glasses (e.g., whether a customer prefers to wear glasses low on the bridge of their nose or high on the bridge of their nose), the tilt through which a customer looks at objects through the lenses, whether the customer uses the glasses for focusing on close objects (e.g., during reading), distant objects (e.g., during sports), or varying ranges (e.g., looking at dashboard signals and road signs while driving), etc. For instance, if a customer regularly reads while looking down at an extreme angle, he or she may benefit from having a higher pantoscopic tilt, and/or a reading region that is positioned lower on the lens, and/or lenses that are taller, and/or lenses positioned lower on the face. In the present disclosure, a frame may be customized to accommodate taller lenses, and/or a frame geometry constructed to position the lenses lower on the customer's face, and/or a reading region of the lenses that is positioned low on the lenses. In another instance, if a customer's nose bridge is very low, he or she may have trouble seeing through the lenses at her desired reading position and distance because normal frames may position the optics too close to her face. In the present disclosure, the vertex distance of the customized product could be optimized to place the lenses at an ideal distance from the customer's eyes.

The present system may determine or receive the preferred viewing angle at which a customer prefers to look at objects through their glasses, given the position of the glasses on their nose. The present system may then present an interface or schematic, for an eyewear professional to adjust the stock eyewear model frame to position the lenses at the optimum optical angle, and/or the lenses may be shaped in accordance with such habits and preferences of the customer (including compensating the optics of a lens for a frame that for aesthetic-reasons may position the lens in a non-optically-optimum location/orientation with respect to the customer and/or the customer's use case). For example, the present system may provide an interface in which the viewing angle is shown as a triangle or color-coded area, and the eyewear professional may be prompted to adjust the configurable portions of the eyewear model until the portions match or align with the color-coded area representing the viewing angle.

Additional measurements may include: the length or angle of the temples and distance between the temples to achieve a fit with the customer's face, the brow, cheekbones, length of nose, and width of the head may provide limitations of where eyewear could fit on a customer's face. Other dimensions of the face, including the shape of head, curvatures, the length, shape, and angle of the nose, and more may be used to fit a frame and lens with optimized comfort and optics for a particular customer's use of the eyewear. In other words, generating lenses for a customer may take into account customer anatomy and customer viewing habits to achieve improved or optimum optical performance/clarity for the customer.

Schematics and instructions provided by the present embodiments may also account for the relationship between lenses and frames for optimizing optical placement. The locations of the pupils relative to eyewear may be important to ensure good optical comfort—an optical goal may be to position the optical center of the lens directly in front of the eye (e.g., pupil and/or iris) when the eye is staring straight-ahead. Incorrect placement can cause unwanted prism effect, which can cause headaches and nausea. In one embodiment, algorithms may aim to optimize lenses, depending on frame shapes.

In one embodiment, an optimization may be obtained by minimizing the distance between: the center of the eyewear and centerline of the nose; the top of each modeled ear at the location of the intersection of the head and the bottoms of the temples (which sit on the top of the ears); nose pads on the eyewear and surface of the nose; center point of the eyes and the design's optimal eye location; pre-determined offset distance between the brow and/or check bones and the specific eyewear front-frame. As previously discussed, the optimization may also be configured to take into account the function of the eyewear (e.g., eyeglasses for reading versus for seeing distant objects), how thick the eyewear is and how well corresponding frames may hide a thick lens edge, and alternately or in addition, the customer's viewing habits when using the eyewear. Frames may also be configured to accommodate, not only the customer's anatomy, but the optimized lenses.

In addition to describing exemplary systems and methods for generating the customized eyewear or generating models of the customized eyewear, the present disclosure also includes exemplary systems and methods for presenting customers with a preview of their fitted eyewear. Such previews may include displays of how the customer may look while wearing the eyewear and/or displays of how the customer may view objects while looking through the lenses of the eyewear. In one embodiment, the displays may include interactive displays, where the customer may further modify geometric, aesthetic, and/or optical aspects of the modeled and displayed eyewear.

The present disclosure also includes exemplary systems and methods for assessing a customer's optical information and creating customized eyewear for the customer based on the determined optical information. While the embodiments of the present disclosure will be described in connection with creating, producing, and delivering custom-fitted eyewear, it will be appreciated that the present disclosure involves the creation, production, and delivery of a wide variety of products that may relate to the anatomical or physical characteristics of the customer as well as the customer's preferences for a particular product. It will be appreciated that describing the disclosed embodiments in terms of the creation, production, and delivery of eyewear carries a large number of similarities to the creation, production, and delivery of a wide variety of products customized to the features and desires of the customer. What follows therefore describes the disclosed embodiments in terms of eyewear, it being understood that the disclosure is not so limited.

A model or 3D model may include a point-cloud, parametric model, a texture-mapped model, surface or volume mesh, or other collection of points, lines, and geometric elements representing an object. Manufacturing instructions may include step-by-step manufacturing instructions, assembly instructions, ordering specifications, CAM files, g-code, automated software instructions, co-ordinates for controlling machinery, templates, images, drawings, material specifications, inspection dimensions or requirements, etc. A manufacturing system may include a computer system configured to deliver manufacturing instructions to eyewear professionals and/or machines, a networked computer system that includes machines configured to follow manufacturing instructions, a series of computer systems and machines that instructions are sequentially passed through, etc. Eyewear may include eyeglass frames, sunglass frames, frames alone, lenses alone, frames and lenses together, prescription eyewear (frames and/or lenses), non-prescription (piano) eyewear (frames and/or lenses), sports eyewear (frames and/or lenses), or electronic or wearable technology eyewear (frames and/or lenses).

In one exemplary embodiment, the computer system described herein may include but not be limited to a tablet, phone, desktop, laptop, kiosk, or wearable computer. The computer system may further comprise server systems that may include storage devices for storing received images and data and/or processing devices for processing received image and data. In one embodiment, computer system may be in communication with an image capture device. Image capture device 103 may include but not be limited to a single-lens camera, video camera, multi-lens camera, a multi-camera, IR camera, laser scanner, interferometer, etc. The image capture device is henceforth referred to as "camera".

In one embodiment, computer system may also be in communication with a display. The display may include but is not be limited to LCD screens, flexible screens, projections, holographic displays, 2D displays, 3D displays, heads-up displays, or other display technologies. The computer system may include an input device for controlling the computer system, including but not limited to a touchscreen, keyboard, mouse, track pad, or gesture sensor. The input device may be part of the display and/or communicate with the display. The computer system may be further configured to provide an interface for a user (e.g., a customer, a user similar or related to the customer, an eyewear professional, etc.) to view, customize, browse, and/or order custom products. This interface may be rendered by display, which may be either part of, or remote, from the computer system, in various embodiments.

In one embodiment, computer system, image capture device, and/or display may communicate to facilitate an eyewear professional in fitting stock eyewear to a customer, using a scan of the customer's anatomy. The fitting performed by the computer system may be based on collected customer anatomy and optical information. Exemplary optical information may be received via a direct transfer of the customer's prescription data, received via word recognition of an image/photograph of the customer's prescription, and/or derived from other imaging of the customer's anatomy. The computer system may be configured to connect to a network or other systems for communicating and transferring data. In one embodiment, network may provide communication between one or more image capture devices, displays, and/or input devices, and the computer system. For example, network may be a bus and/or other hardware connecting one or more of components and modules of one or more image capture devices, displays, and/or input devices, and the computer system. Alternately or in addition, the computer system may be configured to include the image capture device, one or more other image capture devices, the display, one or more other displays, input devices, and/or a combination thereof. The computer system may include or be in communication with any combination of image capture devices, displays, input devices, or other computer system(s). In some embodiments, a customer or an eyewear professional may be in communication with or inputting data into computer system. Such data may include customer anatomy and/or viewing habits.

The computer system may be configured to connect (e.g., via network 109) to other computer system(s), including but not limited to servers, remote computers, etc. The other computer system(s) may be connected to or in control of a manufacturing system. In one embodiment, manufacturing system may receive manufacturing or fitting instructions (e.g., from the computer system). For example, models of customized eyewear determined by computer system may be converted into fitting specifications (e.g., either by the computer system, manufacturing system, or a combination thereof). The manufacturing system may then produce a physical version of the customized eyewear based on the modeled customized eyewear and/or prompt the delivery of the customized product to the customer. For example, manufacturing system may produce and/or deliver customized products using any of the methods and systems described in detail in U.S. patent application Ser. No. 14/466,619, filed Aug. 22, 2014, which is incorporated herein by reference in its entirety.

An exemplary embodiment of optimization may include establishing a cost function for the various parameters of interest in the eyewear and lens designs. The parameters may include but are not limited to: the contour and size of the lens, lens base curve, vertex distance, pantoscopic tilt, reading section position, reading section size, the position of the eyewear on the nose, lens edging parameters, etc. By running such an optimization, one can achieve an output or outputs that achieve the desired output, which can be a weighted balance of aesthetics, comfort, fit on the face, fit of the lens in the frame, optical acuity for distance viewing, optical acuity for reading, etc.

Other frame parameters that are not directly related or are influenced by the optical parameters may be optimized as well. An optimization function known to those familiar with the art, e.g., least squares, may be employed to set the parameters for the eyewear and lens models. Alternatively, some implementations may solve the parameters analytically without optimization if they can be directly solved.

Alternatively, the previously mentioned system and method may be applied with default, non-parametric eyewear. In this embodiment, the eyewear frame may adapted to the customer using only fit parameters and the lens parameters may be adjusted. This may enable automatic and accurate fitting of multi-focal or progressive lenses to any traditional off-the-shelf frame for an individual.

In another embodiment, all the methods and techniques described herein are applied to the customization, rendering, display, and manufacture of custom eyewear cases. A customer could select from a plurality of materials, colors, designs, shapes, and features and see an accurate rendering of the case on his display. Moreover, the case can automatically be sized to fit the custom eyewear designed such that the case securely contains the eyewear. For example, the case can be automatically designed to custom fit the eyewear such that it minimizes the size of the case and increases the case's ability to protect the eyewear in transport. The case color, style, and materials, and method of manufacture can also be matched to those used to make the custom eyewear. Custom text, e.g., the name of the customer, may be engraved or marked on or in the case. The same eyewear manufacturing techniques described herein may also be used to manufacture the custom cases.

Those skilled in the art will recognize that the systems and methods described herein may also be used in the customization, rendering, display, and manufacture of other custom products. Since the technology described applies to the use of custom image data, anatomic models, and product models that are built for customization, a multitude of other products is designed in a similar way, for example: custom jewelry (e.g. bracelets, necklaces, earrings, rings, nose-rings, nose studs, tongue rings/studs, etc.), custom watches (e.g., watch faces, bands, etc.), custom cufflinks, custom bow ties and regular ties, custom tie clips, custom hats, custom bras, Inserts (pads), and other undergarments, custom swimsuits, custom clothing (jackets, pants, shirts, dresses, etc.), custom baby bottle tips and pacifiers (based on scan and reproduction of mother's anatomy), custom prosthetics, custom helmets (motorcycle, bicycle, ski, snowboard, racing, F1, etc.), custom earplugs (active or passive hearing protection), custom audio earphone (e.g., headphone) tips (over-the-ear and in-ear), custom Bluetooth headset tips (over-the-ear or in-ear), custom safety goggles or masks, and custom head-mounted displays.

Figure 6:
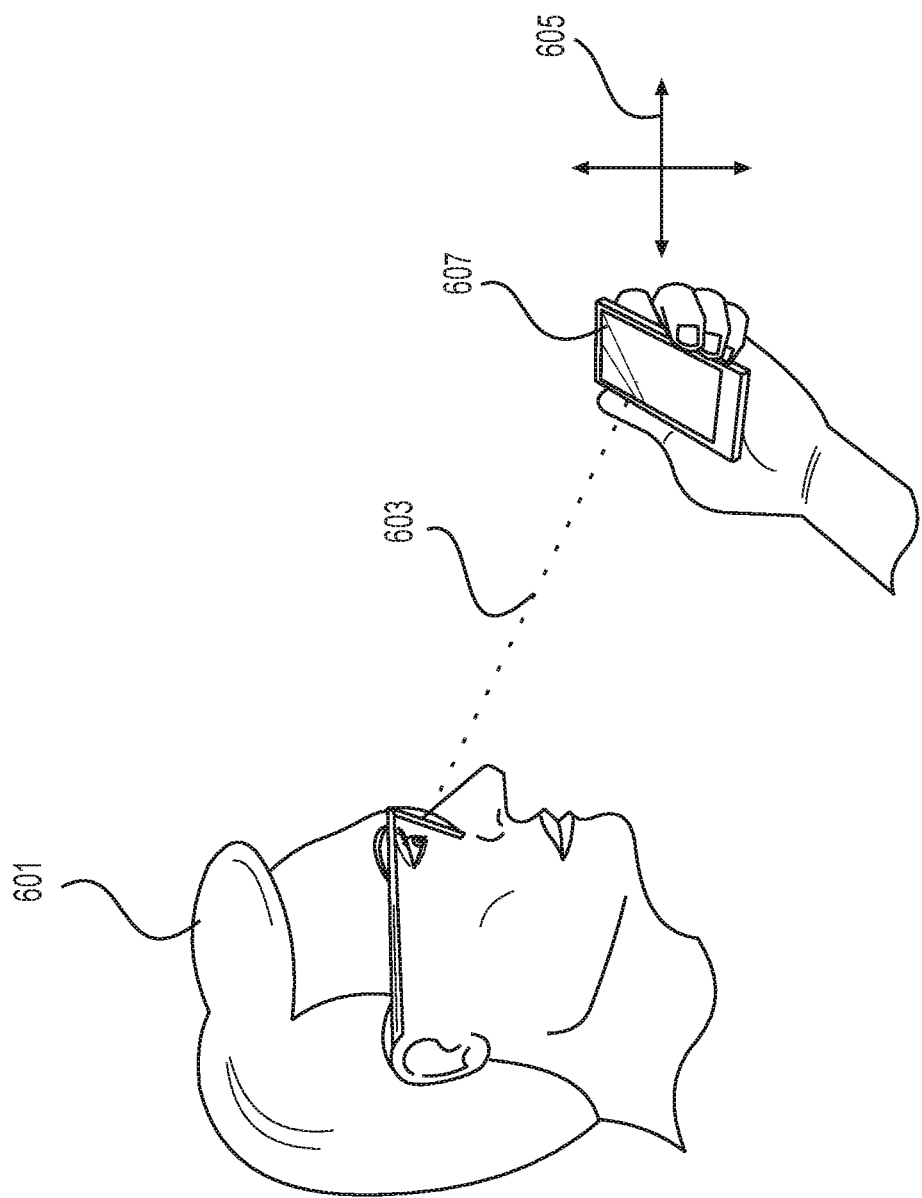
FIG. 6 includes a visual depiction of generating or capturing digital input to construct a scaled reconstruction, according to an embodiment of the present disclosure.

FIG. 6 includes a visual depiction of capturing digital input (e.g., as dictated by assessment platform 101), according to an embodiment of the present disclosure. In one embodiment, user 601 may be prompted to perform capture 603. Digital input may be captured according to certain instructions and orientations 605 in response to cues or prompts. Cues or prompts may be displayed on a screen or communicated via audio, vibration, haptic response, flash, or other visual indicators, either on an image capture device 607, or another device, e.g., a watch. In one embodiment, image capture device 607 may be a mobile device. The cues or prompts may be executed based on a pre-set timing (for a series of directions), face/feature detection and pose estimation, accelerometer data, gyroscope data, detected audio/audio response (from the user), etc.

In another embodiment, all the methods and techniques described herein are applied to the customization, rendering, display, and manufacture of custom eyewear cases. A user could select from a plurality of materials, colors, designs, shapes, and features and see an accurate rendering of the case on his display. Moreover, the case can automatically be sized to fit the custom eyewear designed such that the case securely contains the eyewear. For example, the case can be automatically designed to custom fit the eyewear such that it minimizes the size of the case and increases the case's ability to protect the eyewear in transport. The case color, style, and materials, and method of manufacture can also be matched to those used to make the custom eyewear. Custom text, e.g., the name of the user, may be engraved or marked on or in the case. The same eyewear manufacturing techniques described herein may also be used to manufacture the custom cases.

Those skilled in the art will recognize that the systems and methods described herein may also be used in the customization, rendering, display, and manufacture of other custom products. Since the technology described applies to the use of custom image data, anatomic models, and product models that are built for customization, a multitude of other products is designed in a similar way, for example: custom jewelry (e.g. bracelets, necklaces, earrings, rings, nose-rings, nose studs, tongue rings/studs, etc.), custom watches (e.g., watch faces, bands, etc.), custom cufflinks, custom bow ties and regular ties, custom tie clips, custom hats, custom bras, Inserts (pads), and other undergarments, custom swimsuits, custom clothing (jackets, pants, shirts, dresses, etc.), custom baby bottle tips and pacifiers (based on scan and reproduction of mother's anatomy), custom prosthetics, custom helmets (motorcycle, bicycle, ski, snowboard, racing, F1, etc.), custom earplugs (active or passive hearing protection), custom audio earphone (e.g., headphone) tips (over-the-ear and in-ear), custom Bluetooth headset tips (over-the-ear or in-ear), custom safety goggles or masks, and custom head-mounted displays.

Virtual Appointments

One or more embodiments may include facilitating the ability for a patient to scan themselves from home using their smartphone, tablet, or computer, and then sharing said scan with the optical professional of their choosing, this enables the creation of virtual appointments, which are one-on-one live consultations that are driven by the patient and/or the professional in a shared virtual environment. A professional, trained in the art and science of frame and lens dispensing, can guide the sales consultation and help to navigate the numerous aesthetic and optics considerations around frame and lens choices. Such a virtual consultation can yield business upside to a retailer in the form of expanded hours, geographical catchment area, a deeper customer relationship, increase multi-sales, larger customer lifetime value, and increase purchase frequency, all with a lower return rate and higher customer satisfaction.

According to one or more embodiments, virtual try-on may determine if drill-mount nosepads and nosearms are recommended for acetate frame, and may not only render the result should they be implemented, solving for the new updated fit positioning, adjustment instructions, and optical centration measurements, but can then convey where to install, and how to adjust, these drill-mount adjustable nosepads. This may be useful to customers with low nose bridges, especially if they are a minority in a geographical area where most retailers cater to traditional nose fit intended for Caucasian nasal structure.

Adjustments per adjustment instructions need not be performed by the optician in the retail store—it can also be performed by opticians or staff at the retailers' lens lab of choice, or at a centralized lab owned by said retailer.

Adjustments of stock nosepads for metal:
a. may bring them in (narrower nose) or splay them out (wider nose), or bend asymmetrical (for hooked or asymmetrical nose); also adjust angles of bend in two directions;
b. may model how nosepads often have a pivot (in 1 or 2 directions) and how they will conform to nose, to limit amount of manual pad arm adjustment required; and
c. manual arm adjustment can also push pads backwards in order to move frame/lens farther from face (in case of low nose bridge, or to increase distance till minimum vertex distance is achieved). Vertex distance is the distance from the surface of the eye to the back of the lens.

Exemplary embodiments may use virtual try-on to render color contact lenses extremely photorealistically.

Exemplary embodiments may render photochromatic lenses (lenses that change from light to dark) quite easily, and provide enhanced demos that show environment lighting changing which affects the lens.

Exemplary embodiments may extract lighting from the scene, and then use said lighting to inform the virtual lighting. This technique is called image-based lighting, and may ensure the frames, lenses, face, and interplay between them (aka shadows cast) are as physically-accurate and photorealistic as possible.

Stock frame and lens fitting filters and recommendations may be run on frames alone, interaction of or between frame & face, frame & Rx, and/or frame & face & Rx; aesthetics (style, color, material, type of nosepad geometry, etc), aesthetics based on the shape of face (self-diagnosed or auto-calculated based on 3D shape of face), width and/or height of face or other shape property, age, ethnicity, skin tone, eye color, etc., most of which can be self-diagnosed, but can also be automatically-determined via simple machine-learning models; aesthetics take into account how thickness and distortion of the Rx lens affects the overall look. Said filters and recommendations may identify and report eyewear trends, or can leverage said trends as part of their filtering/recommendation function. Such trends can be geographically segmented (rural/urban, local trends, etc). Some examples of feature of the face used for frame fit filters or recommendations are the shape of nose, ear locations, and cheek detection; for fit filters that take into account Rx considerations, such as if eyes are far from center, may affect overall lens thickness and weight and thus trigger certain fit rules. One such rule may be the maximum lens thickness allowable (taking into account lens index, and since the higher the index the more expensive the lens, may cross a maximum lens price threshold); Another rule may be overall lens weight and the distribution of pressure, with an upper threshold for pressure per square millimeter of nose and/or ear contact area. The system can include estimate of weight, or actual weight of frame and Rx lenses, in any given lens index of refraction; another rule can be the adjustability of the frame (or lack thereof) to different lens base curves or radius of curvature, as well as how the lens is edged (effective base curve of the bevel or groove), and how such curvature affects different portions of the frame geometry, such as the lens opening, bridge, and/or temple splay angle (taking into account the presence of absence of spring hinges). Furthermore, asymmetric temple drop adjustability (or not) may be taken into account, as well as maximum limits which can be hard-set, or such limits can be made to be configurable by a trained professional; One can render cross-section view(s) of the actual stock frame with lens (if there is good 3D shape data of the frame)—either on face or as a sale-support widget or schematic (frame floating in space)—in order to show more-clearly the differences in lens thickness when changing base curve, lens index, and/or frame size/shape; The system may filter based on materials, as well as for the presence of nickel (allowing users with nickel allergies to avoid selecting a frame that would result in skin contact with nickel. The system may allow self-reporting of nickel sensitivity, and then filter materials based on this input, as well as for color and/or style.

Image Based Rendering Techniques (IMBR) may yield a virtual try-on that appears acceptable, but may not be dimensionally accurate. Achieving a post-adjusted look may be difficult using this technique. Resolving it to a drawing may be difficult, since IMBR is not usually to scale (though this limitation may be overcome, especially if the underlying 2D or 3D face model is already to metric scale). But an IMBR approach, coupled with textual adjustment instructions, could deliver usable value. The fidelity and/or accuracy requirements of the 3D texture-mapped asset are, however, nuanced. The rendering may need to only render acceptably on a face, and so interior-facing surfaces, or features that cannot be seen when the eyewear is viewed on the face (e.g. details that are only visible when the frames are folded up and are rested on a table), need not be of high-fidelity (nor possibly even texture-mapped).

Furthermore, as regards to a stock or ready-to-wear product, the 3D asset used for preview may not need to be dimensionally accurate to the level needed for fitting. Embodiments may have one scan process that measured the critical dimensions needed for fitting, and a separate scan process to build the 3D mesh. At a base minimum for stock eyewear fitting is that the glasses sit on the face at only 4 points: top of left and right ear, and each side of the nose. Assessing the amount of nose and/or ear surface contact, and/or the deviation of the nosepads surfaces to the nose surface, may help assess comfort of fit. The distance of the lens from the eye, and the bottom of the frames from the cheeks, may be important inputs. Overall, an estimation of the dimensional accuracy requirement of a 3D scanned frame may be +/−0.5 mm, and points on the nosepad surface be +/−0.25 mm, if the use case is for accurate fitting. However, the dimensional accuracy required for rendering may be as poor as +/−1 mm or more, but it would be operationally simpler if the 3D model used for rendering were physically accurate, as the physical measurements could be taken from the rendering model.

As an alternative to building a 3D model of a frame and texture mapping it, Image-Based Rendering (IMBR) approaches may skip entirely the 3D asset generation step. These techniques may take a series of 2D images of an object from multiple vantage points, and then can generate a photorealistic image of the object from a new vantage point (camera position) not contained in the original dataset. This approach could simplify the asset generation step, but it may not help with providing fitting data (measurements of points off the mesh)—this step would have to be done manually, or off a 3D mesh generated solely for this purpose (but without a need to texture map said mesh). This may not be ideal for a live 3D floating head view because of the need for an extreme number of rendered views, and need for low-latency to yield an acceptable experience, but may be useful for a non-live "camera view" virtual try-on ("VTO") with a limited set of camera view. Also, scaling of the 2D image of the eyewear may potentially be a challenge to match an image of 3D model of a face with known scale.

In other words, in one embodiment, the virtual try-on step may be omitted entirely such that only adjustment instructions are rendered. In this embodiment, there would be no adjusted frame model at all, or at least not to render on a face model. For example, a series of steps in such a method may include: receiving 3D scans and/or 3D CAD files of a plurality of eyewear frames; obtaining a 3D scan and/or images of an individual's face; extracting face measurements of the individual's face from the 3D scan and/or images; calculating fit parameters based on the extracted face measurements of the individual's face and 3D scans and/or 3D CAD files of the plurality of frames; optionally identifying a filtered subset of the plurality of frames that satisfy the calculated fit parameters based on aesthetic, fit, adjustability, and/or optical constraints; selecting or receiving a selection of one of the filtered subset of frames that satisfy the calculated fit parameters; solving for 3D position of wear lens measurements associated with a 3D frame model relative to the individual's extracted face measurements; and generating instructions for adjusting a physical pair of the selected frames to match adjusted 3D frame model.

Since the camera position of each image presented in the virtual try-on ("VTO") (in the camera-based VTO, and not the floating 3D head VTO) is solved for, embodiments may request from an IMBR algorithm a new image of each eyewear captured from said camera position. For a 3D floating-head VTO, each may be restricted to limited set of angles or degree increments between camera views, and then use said technique. The 2D results from the IMBR technique may then need to superimpose realistically on the face, however occlusion and alpha are two areas that pose technical challenges, which can be overcome with effort.

A hybrid IMBR approach may be useful—new camera view images of eyewear (via an IMBR approach) mapped to a series of underlying planes or geometries. The geometries are fit, and the images (which are texture mapped to it) are "along for the ride" and move with the underlying geometry—this hybrid approach may appear to looks quite convincing, even though the actual 3D content is sparse. But the result may only look acceptable from a finite series of camera views, since an IMBR algorithm would need to be run for each camera position requested to be rendered, which may be computationally expensive and this may not satisfy a real-time rendering use case.

Substantially lower-fidelity adjustment instructions may be generated with a few geometric lines or features, yet still be sufficient to convey the desired adjustment intent to the optician. Therefore, adjustment instructions may not need to be powered by, or generated from, a 3D asset. Measurements of the face, and the starting measurements of the frames as received from the manufacturer (the pre-adjusted frame measurements) may be used as input, and a low-fidelity drawing conveying intent (to metric scale) can be generated.

It would also be apparent to one of skill in the relevant art that the present disclosure, as described herein, can be implemented in many different embodiments of software, hardware, firmware, and/or the entities illustrated in the figures. The operational behavior of embodiments may be described with the understanding that modifications and variations of the embodiments are possible, given the level of detail presented herein. It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating instructions for adjusting and previewing stock eyewear frames, the method comprising:
   receiving 3D scans and/or 3D CAD files of a plurality of eyewear frames;
   obtaining a 3D scan and/or images of an individual's face;
   extracting face measurements of the individual's face from the 3D scan and/or images;
   calculating fit parameters based on comparisons between the extracted face measurements of the individual's face and the received 3D scans and/or 3D CAD files of the plurality of eyewear frames;
   aggregating anonymized calculated fit parameters of a plurality of individuals to optimize physical and digital inventory of the plurality of eyewear frames and/or optimizing designs of the plurality of eyewear frames;
   identifying a filtered subset of the plurality of eyewear frames that satisfy the calculated fit parameters based on one or more of aesthetic fit, functional fit, adjustability constraints, and optical constraints;
   selecting or receiving a selection of an eyewear frame of the filtered subset of eyewear frames that satisfy the calculated fit parameters;
   adjusting a 3D frame model of the selected eyewear frame based on the individual's extracted face measurements and/or the calculated fit parameters, according to the one or more of aesthetic fit, functional fit, adjustability constraints, and optical constraints;
   rendering the adjusted 3D frame model and previewing the adjusted 3D frame model over the obtained 3D scan and/or images of the individual's face; and
   generating and outputting a visual display of instructions for physically adjusting a previously manufactured physical pair of eyewear frames corresponding to the selected eyewear frame, the visual display of instructions comprising one or more displayed views of the adjusted 3D frame model of the selected eyewear frame and/or indicated adjustments to the previously manufactured physical pair of eyewear frames causing the previously manufactured physical pair of eyewear frames to match a geometry of the adjusted 3D frame model.

2. The method of claim 1, further comprising:
adjusting the 3D frame model of the selected eyewear frame based on the individual's extracted face measurements by performing one or more non-rigid transformations of the eyewear frames to the face measurements.

3. The method of claim 1, further comprising:
adjusting the 3D frame model of the selected eyewear frame by adjusting parameters associated with one or more of: a front frame curvature of the eyewear frame, nosepads of the eyewear frame, and ear bends and/or temple splay of the temples of the eyewear frame.

4. The method of claim 1, further comprising:
obtaining the 3D scan and/or images of the individual's face using a mobile application of a mobile device of the individual or an embedded browser of a computing device in communication with a depth sensor.

5. The method of claim 1, further comprising:
generating instructions for adjusting the selected eyewear frame by generating a plurality of adjustment deltas between a stock version of the selected eyewear frame and the adjusted version of the 3D frame model.

6. The method of claim 1, further comprising:
generating instructions for adjusting the physical pair of the selected eyewear frame by generating a plurality of views or cross-sections including one or more of top, bottom, front, and side views of the adjusted 3D frame model, wherein the generated views or cross-sections are electronically displayed and/or printed in 1:1 scale relative to a pair of stock frames corresponding to the adjusted 3D frame model.

7. The method of claim 1, wherein selecting or receiving a selection of an eyewear frame of the filtered subset of eyewear frames that satisfy the calculated fit parameters, comprises:
receiving from a user a user-defined selection of the eyewear frame from among the filtered subset of eyewear frames.

8. The method of claim 1, wherein adjusting a 3D frame model of the selected eyewear frame, comprises:
adjusting a 3D frame model of the selected eyewear frame by solving for 3D position of eyewear lens measurements calculated based on the individual's extracted face measurements and/or the calculated fit parameters, according to the one or more of aesthetic fit, functional fit, adjustability constraints, and optical constraints.

9. The method of claim 1, wherein adjusting a 3D frame model of the selected eyewear frame based on the individual's extracted face measurements and/or the calculated fit parameters, comprises:
permanently bending the 3D frame model beyond the elastic limits of deformation of the frame.

10. The method of claim 1, further comprising: analyzing the 3D scan and/or images of the individual's face to iteratively perform a sequence of feature detection, pose estimation, alignment, and model parameter adjustment.

11. A system for generating instructions for adjusting and previewing stock eyewear frames, the system comprising:
at least one memory storing instructions; and
at least one processor configured to execute the instructions to perform operations comprising:
receiving 3D scans and/or 3D CAD files of a plurality of eyewear frames;
obtaining a 3D scan and/or images of an individual's face;
extracting face measurements of the individual's face from the 3D scan and/or images;
calculating fit parameters based on comparisons between the extracted face measurements of the individual's face and the received 3D scans and/or 3D CAD files of the plurality of eyewear frames;
aggregating anonymized calculated fit parameters of a plurality of individuals to optimize physical and digital inventory of the plurality of eyewear frames and/or optimizing designs of the plurality of eyewear frames;
identifying a filtered subset of the plurality of eyewear frames that satisfy the calculated fit parameters based on one or more of aesthetic fit, functional fit, adjustability constraints, and optical constraints;
selecting or receiving a selection of an eyewear frame of the filtered subset of eyewear frames that satisfy the calculated fit parameters;
adjusting a 3D frame model of the selected eyewear frame based on the individual's extracted face measurements and/or the calculated fit parameters, according to the one or more of aesthetic fit, functional fit, adjustability constraints, and optical constraints;
rendering the adjusted 3D frame model and previewing the adjusted 3D frame model over the obtained 3D scan and/or images of the individual's face; and
generating and outputting a visual display of instructions for physically adjusting a previously manufactured physical pair of eyewear frames corresponding to the selected eyewear frame, the visual display of instructions comprising one or more displayed views of the adjusted 3D frame model of the selected eyewear frame and/or indicated adjustments to the previously manufactured physical pair of eyewear frames causing the previously manufactured physical pair of eyewear frames to match a geometry of the adjusted 3D frame model.

12. The system of claim 11, further comprising:
adjusting the 3D frame model of the selected eyewear frame based on the individual's extracted face measurements by performing one or more non-rigid transformations of the eyewear frames to the face measurements.

13. The system of claim 11, further comprising:
adjusting the 3D frame model of the selected eyewear frame by adjusting parameters associated with one or more of: a front frame curvature of the eyewear frame, nosepads of the eyewear frame, and ear bends and/or temple splay of the temples of the eyewear frame.

14. The system of claim 11, further comprising:
obtaining the 3D scan and/or images of the individual's face using a mobile application of a mobile device of the individual or an embedded browser of a computing device in communication with a depth sensor.

15. The system of claim 11, further comprising:
generating instructions for adjusting the selected eyewear frame by generating a plurality of adjustment deltas between a stock version of the selected eyewear frame and the adjusted 3D frame model.

16. The system of claim 11, further comprising:
generating instructions for adjusting the physical pair of the selected frame by generating a plurality of views or cross-sections including one or more of top, bottom, front, and side views of the adjusted 3D frame model, wherein the generated views or cross-sections are electronically displayed and/or printed in 1:1 scale relative to a pair of stock frames corresponding to the adjusted 3D frame model.

17. A computer-implemented method for modelling a human face and eyewear frames to produce a customized stock frame product, the method comprising:
obtaining an inventory comprising a plurality of product frames;
scanning a user's anatomy;
extracting measurements of the user's anatomy;
obtaining a first model of a contour and surface of the user's anatomy, based on the extracted measurements of the user's anatomy;
identifying, based on the contour and the surface of the user's anatomy, a first product frame among the plurality of product frames;
determining adjustments to the first product frame based on the contour and the surface of the user's anatomy;
generating a second model rendering comprising the adjusted first product frame matching the contours and the surface of the user's anatomy;
previewing the second model rendering comprising the adjusted first product frame over the obtained first model of the contour and surface of the user's anatomy, including at least some permanent or inelastic deformation of the first product frame through the adjusting, and optionally also elastic deformation of the first product frame due to modeled pressure between the adjusted first product frame and the measurements of the user's anatomy; and
generating and outputting a visual display of instructions for physically adjusting a previously manufactured physical product frame corresponding to the first product frame, the visual display of instructions comprising one or more displayed views of the determined adjustments to the first product frame and/or indicated adjustments to the previously manufactured physical product frame causing the previously manufactured physical product frame to match a geometry of the determined adjustments to the first product frame.

18. The computer-implemented method of claim 17, further comprising:
outputting the visual display of instructions to a device of at least one from among an optician, a manufacturer, and/or a user.

19. The computer-implemented method of claim 17, wherein the obtaining the inventory comprises at least one from among scanning a database of product frames and/or importing 3D CAD files of product frames.

20. The computer-implemented method of claim 17, wherein the identifying the first product frame comprises filtering out inventory based on at least one from among aesthetic, fit, adjustability, and/or optical considerations.

21. A method of generating instructions for adjusting and previewing stock eyewear frames, the method comprising:
receiving 3D scans and/or 3D CAD files of a plurality of eyewear frames;
obtaining a 3D scan and/or images of an individual's face;
extracting face measurements of the individual's face from the 3D scan and/or images;
calculating fit parameters based on comparisons between the extracted face measurements of the individual's face and the received 3D scans and/or 3D CAD files of the plurality of eyewear frames;
identifying a filtered subset of the plurality of eyewear frames that satisfy the calculated fit parameters based on one or more of aesthetic fit, functional fit, adjustability constraints, and optical constraints;
selecting or receiving a selection of an eyewear frame of the filtered subset of eyewear frames that satisfy the calculated fit parameters;
adjusting a 3D frame model of the selected eyewear frame based on the individual's extracted face measurements and/or the calculated fit parameters, according to one or more of aesthetic, fit, adjustability, and/or optical constraints;
rendering the adjusted 3D frame model and previewing the adjusted 3D frame model over the obtained 3D scan and/or images of the individual's face, including rendering and previewing at least some permanent or inelastic deformation of the 3D frame model through the adjusting, and optionally also elastic deformation of the 3D frame model due to modeled pressure between the adjusted 3D frame model and the 3D scan or face measurements of the individual's face; and
generating and outputting a visual display of instructions for physically adjusting a previously manufactured physical pair of eyewear frames corresponding to the selected eyewear frame, the visual display of instructions comprising one or more displayed views of the adjusted 3D frame model of the selected eyewear frame and/or indicated adjustments to the previously manufactured physical pair of eyewear frames causing the previously manufactured physical pair of eyewear frames to match a geometry of the adjusted 3D frame model.

22. A method of generating instructions for adjusting and previewing stock eyewear frames, the method comprising:
receiving 3D scans and/or 3D CAD files of a plurality of eyewear frames;
obtaining a 3D scan and/or images of an individual's face;
determining facial deformation while obtaining the 3D scan and/or images of the individual's face, wherein the facial deformation occurs due to pressure from the 3D frame model and/or a change in expression; and
reconstructing the 3D scan and/or images of the individual's face by non-rigidly morphing a reconstructed 3D mesh to align with the 3D scan and/or images of the individual's face
extracting face measurements of the individual's face from the 3D scan and/or images;
calculating fit parameters based on comparisons between the extracted face measurements of the individual's face and the received 3D scans and/or 3D CAD files of the plurality of eyewear frames;
identifying a filtered subset of the plurality of eyewear frames that satisfy the calculated fit parameters based on one or more of aesthetic fit, functional fit, adjustability constraints, and optical constraints;
selecting or receiving a selection of an eyewear frame of the filtered subset of eyewear frames that satisfy the calculated fit parameters;
adjusting a 3D frame model of the selected eyewear frame based on the individual's extracted face measurements and/or the calculated fit parameters, according to one or more of aesthetic, fit, adjustability, and/or optical constraints;

rendering the adjusted 3D frame model and previewing the adjusted 3D frame model over the obtained 3D scan and/or images of the individual's face; and generating and outputting a visual display of instructions for physically adjusting a previously manufactured physical pair of eyewear frames corresponding to the selected eyewear frame, the visual display of instructions comprising one or more displayed views of the adjusted 3D frame model of the selected eyewear frame and/or indicated adjustments to the previously manufactured physical pair of eyewear frames causing the previously manufactured physical pair of eyewear frames to match a geometry of the adjusted 3D frame model.

* * * * *